United States Patent
Pietrzyk et al.

(10) Patent No.: US 12,241,357 B2
(45) Date of Patent: Mar. 4, 2025

(54) DYNAMIC CONTROL SYSTEM FOR FIELD OPERATIONS USING TIERED CONSTRUCTION ACTIVITIES

(71) Applicant: Schlumberger Technology Corporation, Sugar Land, TX (US)

(72) Inventors: Jean-Marc Pietrzyk, Cambridge (GB); Richard John Harmer, Cambridge (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/340,232

(22) Filed: Jun. 23, 2023

(65) Prior Publication Data
US 2023/0332494 A1 Oct. 19, 2023

Related U.S. Application Data

(63) Continuation of application No. 17/504,013, filed on Oct. 18, 2021, now Pat. No. 11,725,493, which is a continuation of application No. 16/448,213, filed on Jun. 21, 2019, now Pat. No. 11,149,542.

(60) Provisional application No. 62/687,838, filed on Jun. 21, 2018.

(51) Int. Cl.
| | |
|---|---|
| E21B 44/00 | (2006.01) |
| E21B 47/00 | (2012.01) |
| G05B 15/02 | (2006.01) |
| H04L 67/125 | (2022.01) |
| G06Q 10/0631 | (2023.01) |

(52) U.S. Cl.
CPC ............ *E21B 44/00* (2013.01); *E21B 47/00* (2013.01); *G05B 15/02* (2013.01); *H04L 67/125* (2013.01); *G06Q 10/06313* (2013.01)

(58) Field of Classification Search
CPC ........ E21B 44/00; E21B 47/00; G05B 15/02; H04L 67/125; G06Q 10/06313
See application file for complete search history.

(56) References Cited

U.S. PATENT DOCUMENTS

| | | | | |
|---|---|---|---|---|
| 4,384,612 | A * | 5/1983 | Bradford | E21B 44/00 137/554 |
| 6,542,076 | B1 * | 4/2003 | Joao | B60R 25/102 340/425.5 |
| 8,649,909 | B1 * | 2/2014 | Phillips | H04L 67/02 700/282 |
| 11,149,542 | B2 * | 10/2021 | Pietrzyk | E21B 44/00 |
| 11,725,493 | B2 * | 8/2023 | Pietrzyk | G05B 15/02 702/9 |

(Continued)

*Primary Examiner* — Ramesh B Patel
(74) *Attorney, Agent, or Firm* — Michael West

(57) ABSTRACT

A system and method that may include receiving information and analyzing the information with respect to tiered well construction activities. The system and method may also include determining at least one constraint associated with the tiered well construction activities based on the information. The system and method may additionally include generating a workflow that includes at least a series of tiered well construction activities based on the at least one constraint. The system and method may further include generating a digital well plan that is to be executed to control field equipment to perform at least one of the series of tiered well construction activities of the workflow.

20 Claims, 35 Drawing Sheets

(56) References Cited

U.S. PATENT DOCUMENTS

| | | | |
|---|---|---|---|
| 2008/0173480 A1* | 7/2008 | Annaiyappa | E21B 15/00 |
| | | | 175/24 |
| 2016/0245073 A1* | 8/2016 | Hansen | E21B 43/00 |
| 2018/0089988 A1* | 3/2018 | Schwarzkopf | G06Q 50/08 |
| 2018/0163527 A1* | 6/2018 | Curry | E21B 44/00 |
| 2019/0078426 A1* | 3/2019 | Zheng | E21B 44/00 |
| 2019/0268571 A1* | 8/2019 | Pettersen | H04N 23/69 |
| 2019/0293824 A1* | 9/2019 | Liu | E21B 44/00 |
| 2019/0390547 A1* | 12/2019 | Pietrzyk | G05B 15/02 |
| 2021/0252498 A1* | 8/2021 | Förthmann | B01L 3/0237 |
| 2022/0090492 A1* | 3/2022 | Pietrzyk | E21B 44/00 |
| 2023/0332494 A1* | 10/2023 | Pietrzyk | H04L 67/125 |

\* cited by examiner

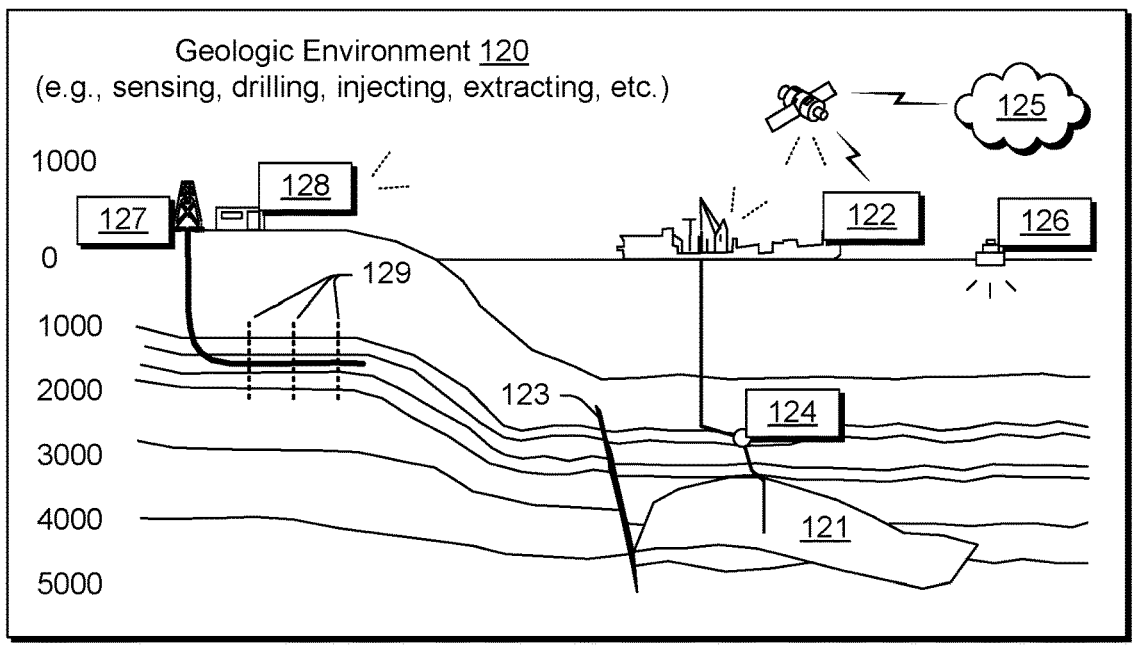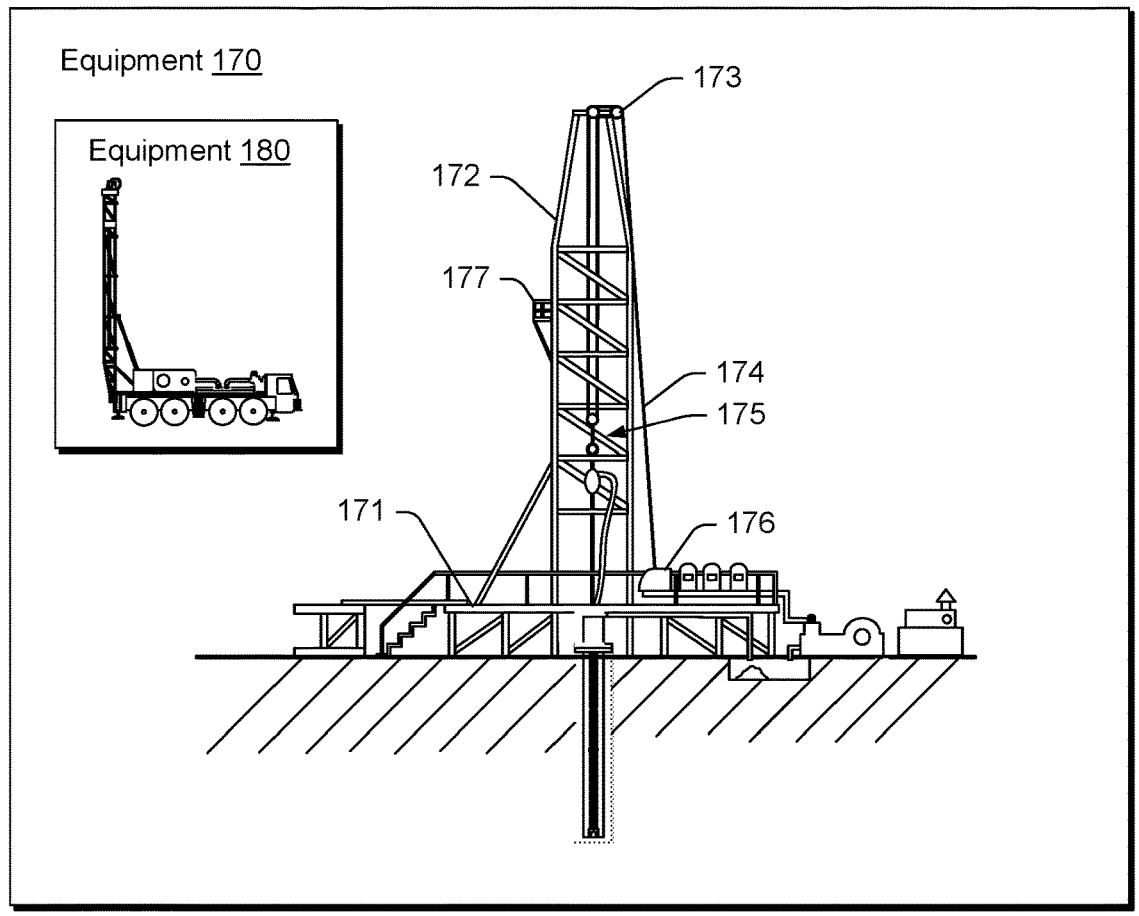
Fig. 1

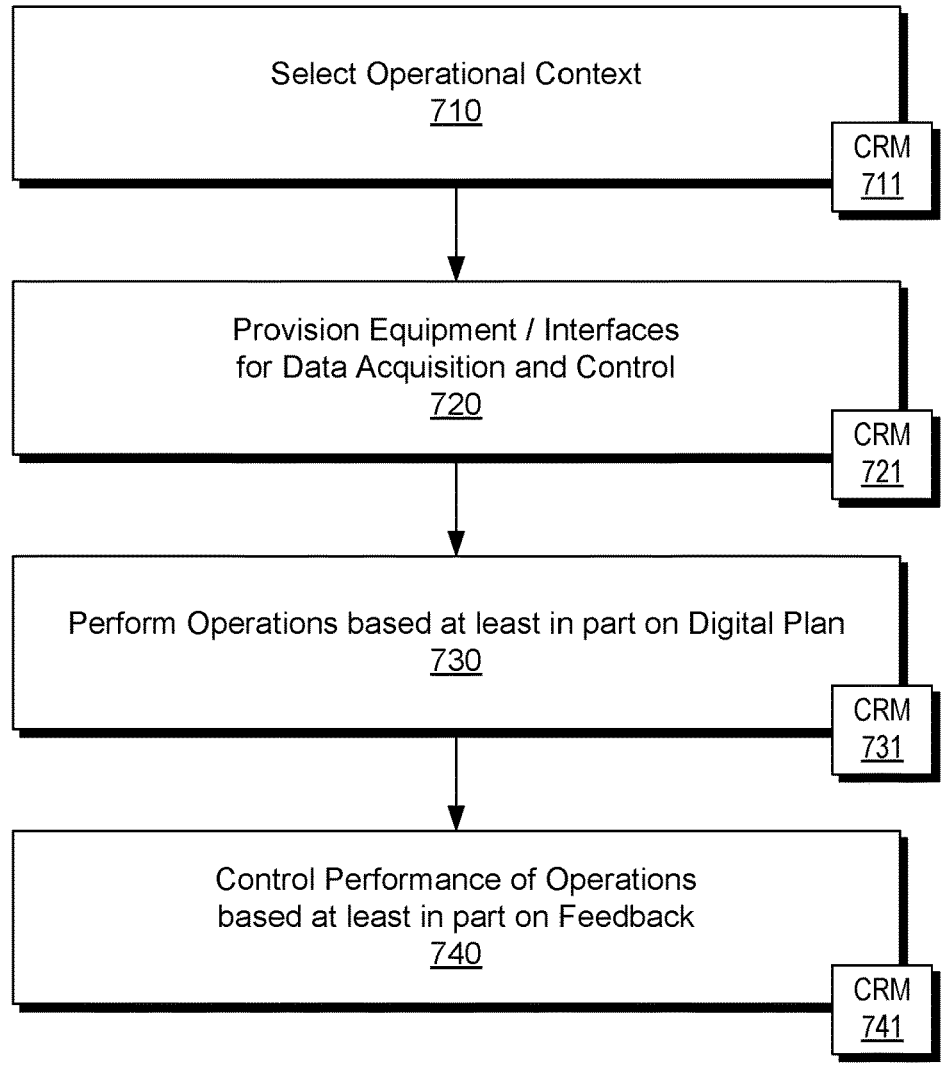
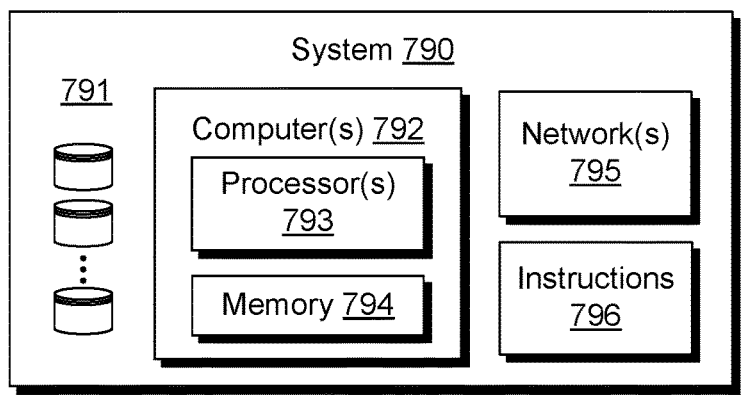
Fig. 7

Method 1600
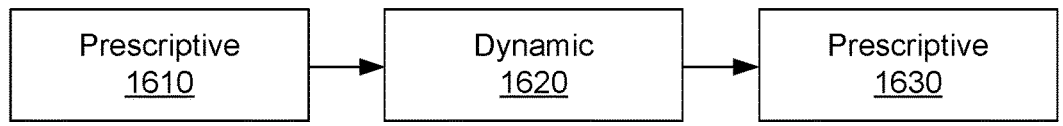
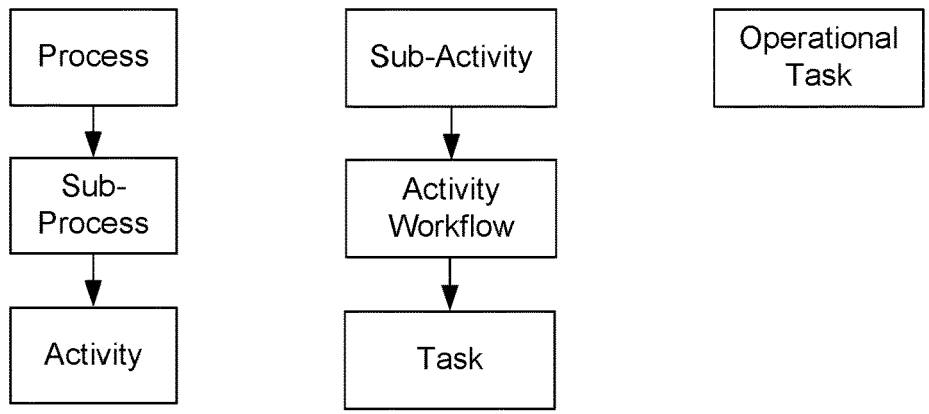
GUI 1690
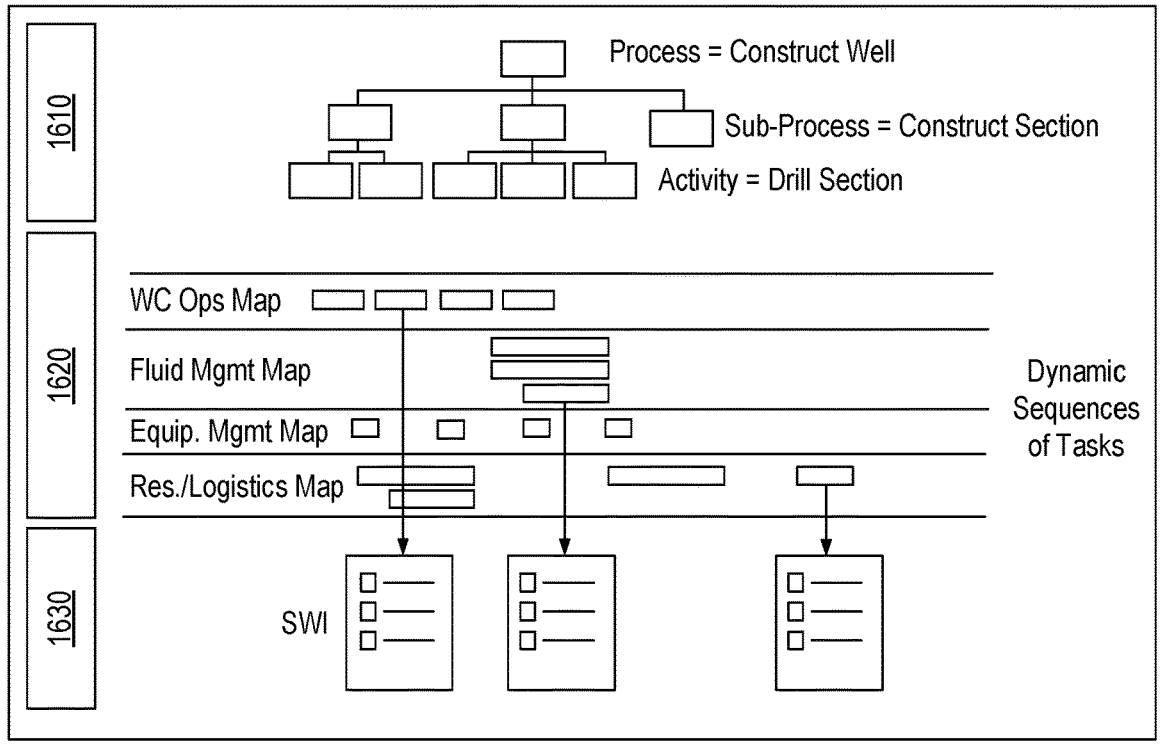
Fig. 16

Method 1700

Method 1800

Method 1900

GUI 2800

| Policy / Standard | Goals | Constraints | |
|---|---|---|---|
| Well construction team remains in control of the state of the well = able to return the well to a stable state in a controlled manner (at which they could walk away) | No loss of well control | Maintain barriers when exposed rock has the ability to flow fluids to surface | Two barriers |
| | Maintain structural integrity of well | Maintain downhole equivalent mud weight above pore pressure at formations that have the ability to flow fluids to surface | Pore pressure + XXX psi |
| | | Maintain kick tolerance | > XX bbls |
| | | Prove integrity of cemented casing prior to proceeding to drill out of casing | Casing integrity test CIT to XXXX psi |
| | | Prove the casing shoe and formation around the shoe has sufficient integrity (defined by planning phase engineering calculations) prior to drilling of the next hole section (achieved by performing a formation integrity test FIT or leak off test LOT) | ECD @ csg shoe < XX ppg |
| | | Excess fluids resources on location (lost circulation mitigation) | XXX bbls of drilling fluid, XXX sacks barite, etc. |
| | | Preserve cement bond around casing shoe | Parameter envelope |
| | | Reduction in casing integrity due to casing wear | Loss of well thickness XX in |
| | | Casing collapse pressure | XXX psi Height of fluid in annulus |

Fig. 28

GUI 2900

| Policy / Standard | Goals | Constraints | |
|---|---|---|---|
| Minimize risk to humans operating the technology / equipment provided for the well construction process | No HSE events | Permit to work procedure | Signed off prior to starting job |
| | | Personnel training certifications | H2S training Offshore survival .. |
| | | Equipment maintenance schedules | Inspect derrick each rig move |
| | | Lock out tag out process | Equipment locked out prior to starting job |

Fig. 29

GUI 3000

| Policy / Standard | Goals | Constraints | |
|---|---|---|---|
| Identify the most cost effective method to extract hydrocarbons from the reservoir, with consideration for the life cycle of the well | Place the well at the desired position within the reservoir | • Technology limitations (seismic, mud logging, MWD, LWD)<br>• Heterogeneity of the reservoir | • Surveying error models (accuracy)<br>• Measurement depth of investigation<br>• Directional capabilities<br>• Drillstring fatigue .. |
| | Consistently operate the drilling system at its technical limit | • Equipment performance curves / capacities<br>• Equipment fatigue life / wear<br>• Rig electrical power<br>• Drilling contractor de-rating | Torque<br>Pressure<br>RPM .. |
| | Initial production rate > XXX bbls / day | • Size of production tubing set in the reservoir<br>• Max draw down<br>• Semi-submersible performance<br>• Surface facilities | |
| | Produce more than XXXX bbls in X years<br>• Lateral length in the reservoir<br>• % of lateral in the reservoir | | |
| | Deliver well within planned AFE | | |
| | Avoid stuck pipe events | Stabilize BHA every XX ft (to minimize risk of differential sticking) | |
| | | Wiper trip strategy | |
| | | Hole conditioning at connections (client SOP) | |

Fig. 30

GUI 3100

| Policy / Standard | Goals | Constraints |
|---|---|---|
| Conform to country / state / government regulations | No actions taken that contradict regulations | Test well control equipment every XX days |
| | Provide information required by regulatory authorities in a timely manner | Understand the position of the well to within an uncertainty of XX ft (at 95 % confidence 3 sigma) (in the event that a relief well is required) |
| | | Plans in place for a relief well |
| | | Isolate ground water |
| | | Isolate certain formations |

Fig. 31

GUI 3200

|  | CT(h) | ET(h) | TT (days) |
|---|---|---|---|
| ▽ Construct Well | | | |
| ▷ Construct Section 17.5 in | 59.91 | 59.91 | 2.50 |
| ▷ Construct Section 12.5 in | 106.61 | 106.61 | 6.94 |
| ▽ Construct Section 8.5 in | | | |
|    Drilling run (3530-6530ft) | | | |
|      Safety Meeting | 0.25 | 0.25 | 6.95 |
|      Make up BHA | 2.04 | 2.04 | 7.03 |
|      Trip in to depth (0-1030ft) | 0.87 | 0.87 | 7.11 |
|      Drill shoe track (1030-3530ft) | 102.08 | 102.08 | 11.37 |
|      Drill to depth (3530-6530ft) | 1.02 | 1.02 | 11.41 |
|      Circulate to condition hole | 0.25 | 0.25 | 11.42 |
|      Conduct flow check | 0.25 | 0.25 | 11.43 |
|      Pump slug sweep pill spacer | 5.54 | 5.54 | 11.66 |
|      Trip out to depth (6530-0ft) | 2.04 | 2.04 | 11.75 |
|      Lay down BHA | | | |
|    Wireline run | | | |
|      Make up wireline toolstring | 2.04 | 2.04 | 11.83 |
|      Run in wireline to depth (0-6530ft) | 1.85 | 1.85 | 11.91 |
|      Up log wireline to depth (3070-0ft) | 5.09 | 5.09 | 12.12 |
|      Lay down wireline toolstring | 2.04 | 2.04 | 12.23 |

Fig. 32

DYNAMIC CONTROL SYSTEM FOR FIELD OPERATIONS USING TIERED CONSTRUCTION ACTIVITIES

RELATED APPLICATIONS

This application is a continuation and claims the benefit of and priority of U.S. application Ser. No. 17/504,013, filed on 18 Oct. 2021 (published as U.S. publication number 2022/0090492 on 24 Mar. 2022 and issued as U.S. Pat. No. 11,725,493B2 on 15 Aug. 2023) which is a continuation of U.S. patent application Ser. No. 16/448,213 filed on 21 Jun. 2019 (issued as U.S. Pat. No. 11, 149,542) entitled "Dynamic System for Field Operations" which claims priority to and the benefit of U.S. Provisional Application having Ser. No. 62/687,838, filed 21 Jun. 2018, each of which is incorporated by reference herein.

BACKGROUND

A resource field can be an accumulation, pool or group of pools of one or more resources (e.g., oil, gas, oil and gas) in a subsurface environment. A resource field can include at least one reservoir. A reservoir may be shaped in a manner that can trap hydrocarbons and may be covered by an impermeable or sealing rock. A bore can be drilled into an environment where the bore may be utilized to form a well that can be utilized in producing hydrocarbons from a reservoir.

A rig can be a system of components that can be operated to form a bore in an environment, to transport equipment into and out of a bore in an environment, etc. As an example, a rig can include a system that can be used to drill a bore and to acquire information about an environment, about drilling, etc. A resource field may be an onshore field, an offshore field or an on- and offshore field. A rig can include components for performing operations onshore and/or offshore. A rig may be, for example, vessel-based, offshore platform-based, onshore, etc.

Field planning and/or development can occur over one or more phases, which can include an exploration phase that aims to identify and assess an environment (e.g., a prospect, a play, etc.), which may include drilling of one or more bores (e.g., one or more exploratory wells, etc.).

SUMMARY

A method that may include receiving information and analyzing the information with respect to tiered well construction activities. The method may also include determining at least one constraint associated with the tiered well construction activities based on the information. The method may additionally include generating a workflow that includes at least a series of tiered well construction activities based on the at least one constraint. The method may further include generating a digital well plan that is to be executed to control field equipment to perform at least one of the series of tiered well construction activities of the workflow. A system may include a processor; memory accessible by the processor; processor-executable instructions stored in the memory and executable to instruct the system to: receive information and analyzing the information with respect to tiered well construction activities. The instructions may also instruct the system to determine at least one constraint associated with the tiered well construction activities based on the information. The instructions may additionally instruct the system to generate a workflow that includes at least a series of tiered well construction activities based on the at least one constraint. The instructions may further instruct the system to generate a digital well plan that is to be executed to control field equipment to perform at least one of the series of tiered well construction activities of the workflow. A non-transitory computer-readable storage medium storing instructions that when executed by a computer, that may include receiving information and analyzing the information with respect to tiered well construction activities. The method may also include determining at least one constraint associated with the tiered well construction activities based on the information. The method may additionally include generating a workflow that includes at least a series of tiered well construction activities based on the at least one constraint. The method may further include generating a digital well plan that is to be executed to control field equipment to perform at least one of the series of tiered well construction activities of the workflow. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 1 illustrates examples of equipment in a geologic environment;

FIG. 7 illustrates an example of a method and an example of a system;

FIG. 16 illustrates an example of a method and an example of a graphical user interface;

FIG. 28 illustrates an example of a graphical user interface;

FIG. 29 illustrates an example of a graphical user interface;

FIG. 30 illustrates an example of a graphical user interface;

FIG. 31 illustrates an example of a graphical user interface;

FIG. 32 illustrates an example of a graphical user interface;

DETAILED DESCRIPTION

Figure 2:
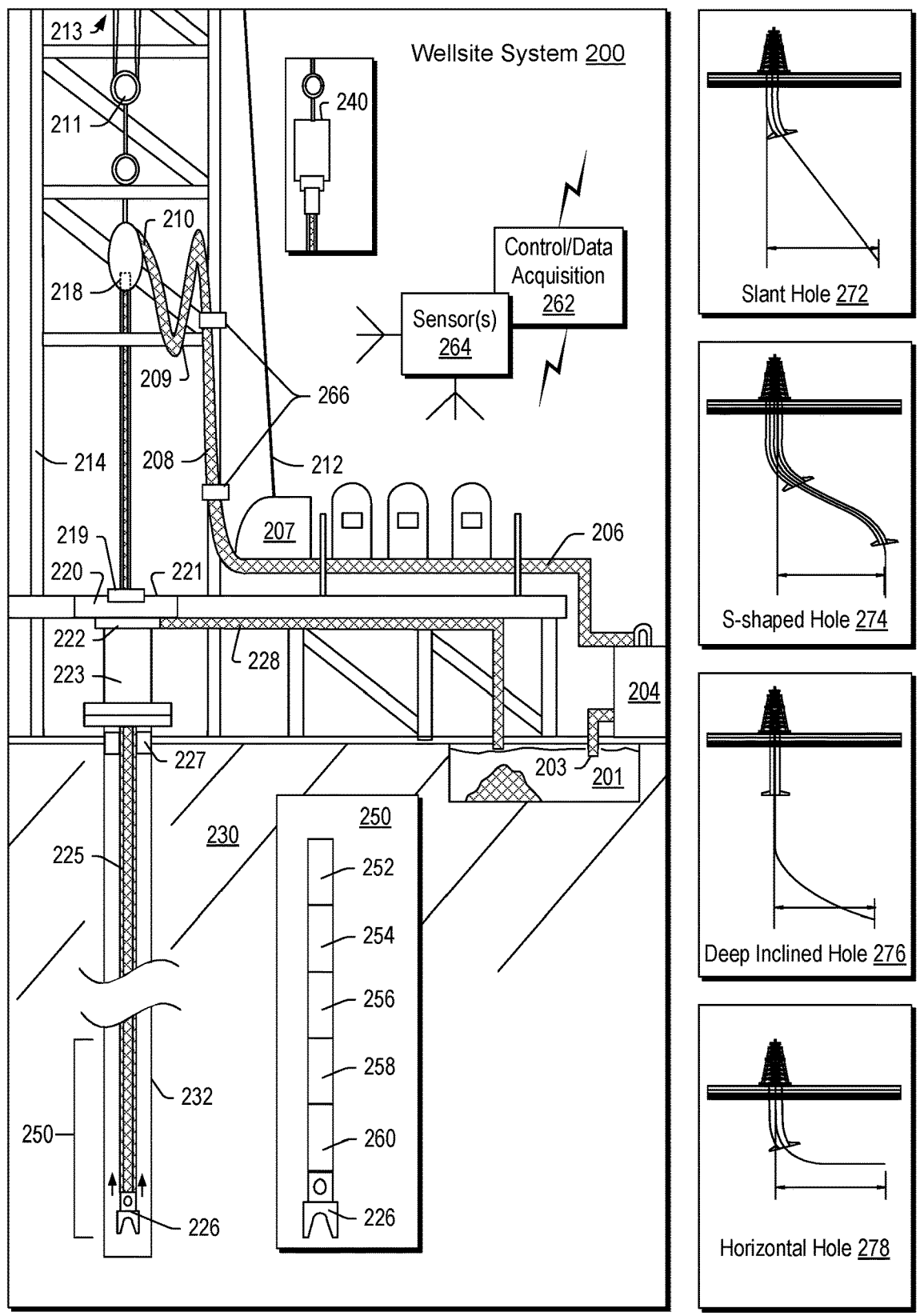
FIG. 2 illustrates examples of equipment and examples of hole types.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion (e.g., a lateral portion) that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system (e.g., an offshore rig, etc.).

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrickman may be a rig crew member that works on a platform attached to a derrick or a mast. A derrick can include a landing on which a derrickman may stand. As an example, such a landing may be about 10 meters or more above a rig floor. In an operation referred to as trip out of the hole (TOH), a derrickman may wear a safety harness that enables leaning out from the work landing (e.g., monkeyboard) to reach pipe located at or near the center of a derrick or a mast and to throw a line around the pipe and pull it back into its storage location (e.g., fingerboards), for example, until it may be desirable to run the pipe back into the bore. As an example, a rig may include automated pipe-handling equipment such that the derrickman controls the machinery rather than physically handling the pipe.

As an example, a trip may refer to the act of pulling equipment from a bore and/or placing equipment in a bore. As an example, equipment may include a drillstring that can be pulled out of a hole and/or placed or replaced in a hole. As an example, a pipe trip may be performed where a drill bit has dulled or has otherwise ceased to drill efficiently and is to be replaced. As an example, a trip that pulls equipment out of a borehole may be referred to as pulling out of hole (POOH) and a trip that runs equipment into a borehole may be referred to as running in hole (RIH).

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use one or more directional drilling techniques, equipment, etc.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the traveling block 211 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drill string 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drill string 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measurement-while-drilling (MWD) module 256, an optional module 258, a rotary-steerable system (RSS) and/or motor 260, and the drill bit 226. Such components or modules may be referred to as tools where a drillstring can include a plurality of tools.

As to a RSS, it involves technology utilized for direction drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling can commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; however, a mud motor can present some challenges depending on factors such as rate of penetration (ROP), transferring weight to a bit (e.g., weight on bit, WOB) due to friction, etc. A mud motor can be a positive displacement motor (PDM) that operates to drive a bit during directional drilling. A PDM operates as drilling fluid is pumped through it where the PDM converts hydraulic power of the drilling fluid into mechanical power to cause the bit to rotate. A PDM can operate in a so-called sliding mode, when the drillstring is not rotated from the surface.

A RSS can drill directionally where there is continuous rotation from surface equipment, which can alleviate the sliding of a steerable motor (e.g., a PDM). A RSS may be deployed when drilling directionally (e.g., deviated, horizontal, or extended-reach wells). A RSS can aim to minimize interaction with a borehole wall, which can help to preserve borehole quality. A RSS can aim to exert a relatively consistent side force akin to stabilizers that rotate with the drillstring or orient the bit in the desired direction while continuously rotating at the same number of rotations per minute as the drillstring.

The LWD module 254 may be housed in a suitable type of drill collar and can contain one or a plurality of selected types of logging tools. It will also be understood that more than one LWD and/or MWD module can be employed, for example, as represented at by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As mentioned, a steerable system can be or include an RSS. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", this can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 3:
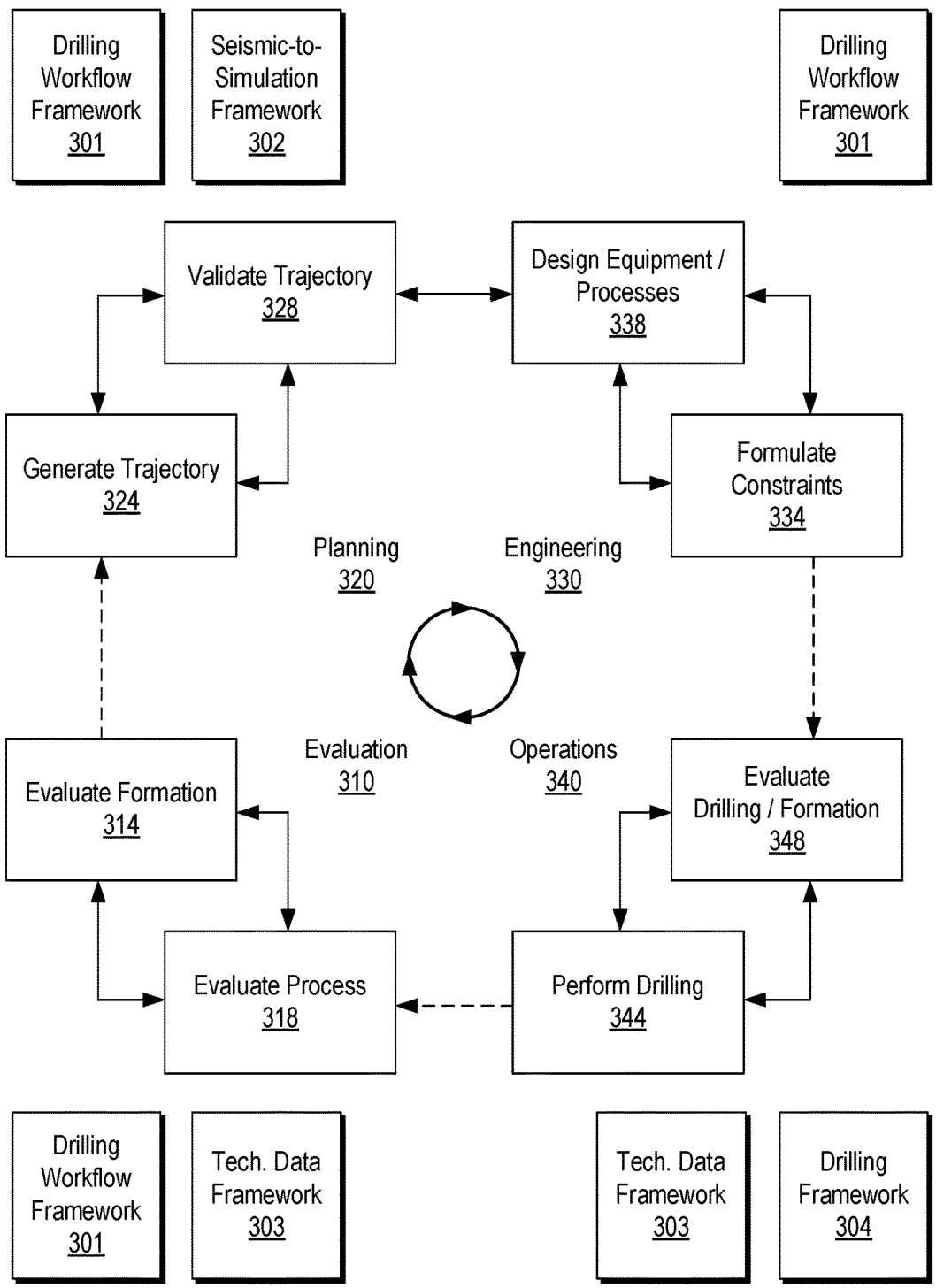
FIG. 3 illustrates an example of a system.

FIG. 3 shows an example of a system 300 that includes various equipment for evaluation 310, planning 320, engineering 330 and operations 340. For example, a drilling workflow framework 301, a seismic-to-simulation framework 302, a technical data framework 303 and a drilling framework 304 may be implemented to perform one or more processes such as a evaluating a formation 314, evaluating a process 318, generating a trajectory 324, validating a trajectory 328, formulating constraints 334, designing equipment and/or processes based at least in part on constraints 338, performing drilling 344 and evaluating drilling and/or formation 348.

In the example of FIG. 3, the seismic-to-simulation framework 302 can be, for example, the PETREL framework (Schlumberger, Houston, Texas) and the technical data framework 303 can be, for example, the TECHLOG framework (Schlumberger, Houston, Texas).

As an example, a framework can include entities that may include earth entities, geological objects or other objects such as wells, surfaces, reservoirs, etc. Entities can include virtual representations of actual physical entities that are reconstructed for purposes of one or more of evaluation, planning, engineering, operations, etc.

Entities may include entities based on data acquired via sensing, observation, etc. (e.g., seismic data and/or other information). An entity may be characterized by one or more properties (e.g., a geometrical pillar grid entity of an earth model may be characterized by a porosity property). Such properties may represent one or more measurements (e.g., acquired data), calculations, etc.

A framework may be an object-based framework. In such a framework, entities may include entities based on pre-defined classes, for example, to facilitate modeling, analysis, simulation, etc. An example of an object-based framework is the MICROSOFT .NET framework (Redmond, Washington), which provides a set of extensible object classes. In the .NET framework, an object class encapsulates a module of reusable code and associated data structures. Object classes can be used to instantiate object instances for use in by a program, script, etc. For example, borehole classes may define objects for representing boreholes based on well data.

As an example, a framework may be implemented within or in a manner operatively coupled to the DELFI cognitive exploration and production (E&P) environment (Schlumberger, Houston, Texas), which is a secure, cognitive, cloud-based collaborative environment that integrates data and workflows with digital technologies, such as artificial intelligence and machine learning. As an example, such an environment can provide for operations that involve one or more frameworks.

As an example, a framework can include an analysis component that may allow for interaction with a model or model-based results (e.g., simulation results, etc.). As to simulation, a framework may operatively link to or include a simulator such as the ECLIPSE reservoir simulator (Schlumberger, Houston Texas), the INTERSECT reservoir simulator (Schlumberger, Houston Texas), etc.

The aforementioned PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, well engineers, reservoir engineers, etc.) can develop collaborative workflows and integrate operations to streamline processes. Such a framework may be considered an application and may be considered a data-driven application (e.g., where data is input for purposes of modeling, simulating, etc.).

As mentioned with respect to the DELFI environment, one or more frameworks may be interoperative and/or run upon one or another. As an example, a framework environment marketed as the OCEAN framework environment (Schlumberger, Houston, Texas) may be utilized, which allows for integration of add-ons (or plug-ins) into a PETREL framework workflow. In an example embodiment, various components may be implemented as add-ons (or plug-ins) that conform to and operate according to specifications of a framework environment (e.g., according to application programming interface (API) specifications, etc.).

As an example, a framework can include a model simulation layer along with a framework services layer, a framework core layer and a modules layer. In a framework environment (e.g., OCEAN, DELFI, etc.), a model simulation layer can include or operatively link to a model-centric framework. In an example embodiment, a framework may be considered to be a data-driven application. For example, the PETREL framework can include features for model building and visualization. As an example, a model may include one or more grids where a grid can be a spatial grid that conforms to spatial locations per acquired data (e.g., satellite data, logging data, seismic data, etc.).

As an example, a model simulation layer may provide domain objects, act as a data source, provide for rendering and provide for various user interfaces. Rendering capabilities may provide a graphical environment in which applications can display their data while user interfaces may provide a common look and feel for application user interface components.

As an example, domain objects can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

As an example, data may be stored in one or more data sources (or data stores, generally physical data storage devices), which may be at the same or different physical sites and accessible via one or more networks. As an example, a model simulation layer may be configured to model projects. As such, a particular project may be stored where stored project information may include inputs, models, results and cases. Thus, upon completion of a modeling session, a user may store a project. At a later time, the project can be accessed and restored using the model simulation layer, which can recreate instances of the relevant domain objects.

As an example, the system 300 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable at least in part in the PETREL framework, for example, that operates on seismic data, seismic attribute(s), etc.

As an example, seismic data can be data acquired via a seismic survey where sources and receivers are positioned in a geologic environment to emit and receive seismic energy where at least a portion of such energy can reflect off subsurface structures. As an example, a seismic data analysis framework or frameworks (e.g., consider the OMEGA framework, marketed by Schlumberger, Houston, Texas) may be utilized to determine depth, extent, properties, etc. of subsurface structures. As an example, seismic data analysis can include forward modeling and/or inversion, for example, to iteratively build a model of a subsurface region of a geologic environment. As an example, a seismic data analysis framework may be part of or operatively coupled to a seismic-to-simulation framework (e.g., the PETREL framework, etc.).

As an example, a workflow may be a process implementable at least in part in a framework environment and by one or more frameworks. As an example, a workflow may include one or more worksteps that access a set of instructions such as a plug-in (e.g., external executable code, etc.). As an example, a framework environment may be cloud-based where cloud resources are utilized that may be operatively coupled to one or more pieces of field equipment such that data can be acquired, transmitted, stored, processed, analyzed, etc., using features of a framework environment. As an example, a framework environment may employ various types of services, which may be backend, frontend or backend and frontend services. For example, consider a client-server type of architecture where communications may occur via one or more application programming interfaces (APIs), one or more microservices, etc.

As an example, a framework may provide for modeling petroleum systems. For example, the modeling framework marketed as the PETROMOD framework (Schlumberger, Houston, Texas), which includes features for input of various types of information (e.g., seismic, well, geological, etc.) to model evolution of a sedimentary basin. The PETROMOD framework provides for petroleum systems modeling via input of various data such as seismic data, well data and other geological data, for example, to model evolution of a sedimentary basin. The PETROMOD framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL framework, workflows may be constructed to provide basin-to-prospect scale exploration solutions. Data exchange between frameworks can facilitate construction of models, analysis of data (e.g., PETROMOD framework data analyzed using PETREL framework capabilities), and coupling of workflows.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger, Houston, Texas) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG framework. As an example, the TECHLOG framework can be interoperable with one or more other frameworks such as, for example, the PETREL framework.

As an example, various aspects of a workflow may be completed automatically, may be partially automated, or may be completed manually, as by a human user interfacing with a software application that executes using hardware (e.g., local and/or remote). As an example, a workflow may be cyclic, and may include, as an example, four stages such as, for example, an evaluation stage (see, e.g., the evaluation equipment 310), a planning stage (see, e.g., the planning equipment 320), an engineering stage (see, e.g., the engineering equipment 330) and an execution stage (see, e.g., the operations equipment 340). As an example, a workflow may commence at one or more stages, which may progress to one or more other stages (e.g., in a serial manner, in a parallel manner, in a cyclical manner, etc.).

As an example, a workflow can commence with an evaluation stage, which may include a geological service provider evaluating a formation (see, e.g., the evaluation block 314). As an example, a geological service provider may undertake the formation evaluation using a computing system executing a software package tailored to such activity; or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory (see, e.g., the generation block 324), which may involve execution of one or more G&G software packages. Examples of such software packages include the PETREL framework. As an example, a G&G service provider may determine a well trajectory or a section thereof, based on, for example, one or more model(s) provided by a formation evaluation (e.g., per the evaluation block 314), and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

As an example, a workflow may progress to a first engineering service provider (e.g., one or more processing machines associated therewith), which may validate a well trajectory and, for example, relief well design (see, e.g., the validation block 328). Such a validation process may include evaluating physical properties, calculations, risk tolerances, integration with other aspects of a workflow, etc. As an example, one or more parameters for such determinations may be maintained by a server and/or by the first engineering service provider; noting that one or more model(s), well trajectory(ies), etc. may be maintained by a server and accessed by the first engineering service provider. For example, the first engineering service provider may include one or more computing systems executing one or more software packages. As an example, where the first engineering service provider rejects or otherwise suggests an adjustment to a well trajectory, the well trajectory may be adjusted or a message or other notification sent to the G&G service provider requesting such modification.

As an example, one or more engineering service providers (e.g., first, second, etc.) may provide a casing design, bottom-hole assembly (BHA) design, fluid design, and/or the like, to implement a well trajectory (see, e.g., the design block 338). In some embodiments, a second engineering service provider may perform such design using one of more software applications. Such designs may be stored in one or more databases maintained by one or more servers, which may, for example, employ STUDIO framework tools (Schlumberger, Houston, Texas), and may be accessed by one or more of the other service providers in a workflow.

As an example, a second engineering service provider may seek approval from a third engineering service provider for one or more designs established along with a well trajectory. In such an example, the third engineering service provider may consider various factors as to whether the well engineering plan is acceptable, such as economic variables (e.g., oil production forecasts, costs per barrel, risk, drill time, etc.), and may request authorization for expenditure, such as from the operating company's representative, well-owner's representative, or the like (see, e.g., the formulation block 334). As an example, at least some of the data upon which such determinations are based may be stored in one or more database maintained by one or more servers. As an example, a first, a second, and/or a third engineering service provider may be provided by a single team of engineers or even a single engineer, and thus may or may not be separate entities.

As an example, where economics may be unacceptable or subject to authorization being withheld, an engineering service provider may suggest changes to casing, a bottom-hole assembly, and/or fluid design, or otherwise notify and/or return control to a different engineering service provider, so that adjustments may be made to casing, a bottom-hole assembly, and/or fluid design. Where modifying one or more of such designs is impracticable within well constraints, trajectory, etc., the engineering service provider may suggest an adjustment to the well trajectory and/or a workflow may return to or otherwise notify an initial engineering service provider and/or a G&G service provider such that either or both may modify the well trajectory.

As an example, a workflow can include considering a well trajectory, including an accepted well engineering plan, and a formation evaluation. Such a workflow may then pass control to a drilling service provider, which may implement the well engineering plan, establishing safe and efficient drilling, maintaining well integrity, and reporting progress as well as operating parameters (see, e.g., the blocks 344 and 348). As an example, operating parameters, formation encountered, data collected while drilling (e.g., using logging-while-drilling or measuring-while-drilling technology), may be returned to a geological service provider for evaluation. As an example, the geological service provider may then re-evaluate the well trajectory, or one or more other aspects of the well engineering plan, and may, in some cases, and potentially within predetermined constraints, adjust the well engineering plan according to the real-life drilling parameters (e.g., based on acquired data in the field, etc.).

Whether the well is entirely drilled, or a section thereof is completed, depending on the specific embodiment, a workflow may proceed to a post review (see, e.g., the evaluation block 318). As an example, a post review may include reviewing drilling performance. As an example, a post review may further include reporting the drilling performance (e.g., to one or more relevant engineering, geological, or G&G service providers).

Various activities of a workflow may be performed consecutively and/or may be performed out of order (e.g., based partially on information from templates, nearby wells, etc. to fill in any gaps in information that is to be provided by another service provider). As an example, undertaking one activity may affect the results or basis for another activity, and thus may, either manually or automatically, call for a variation in one or more workflow activities, work products, etc. As an example, a server may allow for storing information on a central database accessible to various service providers where variations may be sought by communication with an appropriate service provider, may be made automatically, or may otherwise appear as suggestions to the relevant service provider. Such an approach may be considered to be a holistic approach to a well workflow, in comparison to a sequential, piecemeal approach.

As an example, various actions of a workflow may be repeated multiple times during drilling of a wellbore. For example, in one or more automated systems, feedback from a drilling service provider may be provided at or near real-time, and the data acquired during drilling may be fed to one or more other service providers, which may adjust its piece of the workflow accordingly. As there may be dependencies in other areas of the workflow, such adjustments may permeate through the workflow, e.g., in an automated fashion. In some embodiments, a cyclic process may additionally or instead proceed after a certain drilling goal is reached, such as the completion of a section of the wellbore, and/or after the drilling of the entire wellbore, or on a per-day, week, month, etc. basis.

Well planning can include determining a path of a well (e.g., a trajectory) that can extend to a reservoir, for example, to economically produce fluids such as hydrocarbons therefrom. Well planning can include selecting a drilling and/or completion assembly which may be used to implement a well plan. As an example, various constraints can be imposed as part of well planning that can impact design of a well. As an example, such constraints may be imposed based at least in part on information as to known geology of a subterranean domain, presence of one or more other wells (e.g., actual and/or planned, etc.) in an area (e.g., consider collision avoidance), etc. As an example, one or more constraints may be imposed based at least in part on characteristics of one or more tools, components, etc. As an example, one or more constraints may be based at least in part on factors associated with drilling time and/or risk tolerance.

As an example, a system can allow for a reduction in waste, for example, as may be defined according to LEAN. In the context of LEAN, consider one or more of the following types of waste: transport (e.g., moving items unnecessarily, whether physical or data); inventory (e.g., components, whether physical or informational, as work in process, and finished product not being processed); motion (e.g., people or equipment moving or walking unnecessarily to perform desired processing); waiting (e.g., waiting for information, interruptions of production during shift change, etc.); overproduction (e.g., production of material, information, equipment, etc. ahead of demand); over processing (e.g., resulting from poor tool or product design creating activity); and defects (e.g., effort involved in inspecting for and fixing defects whether in a plan, data, equipment, etc.). As an example, a system that allows for actions (e.g., methods, workflows, etc.) to be performed in a collaborative manner can help to reduce one or more types of waste.

As an example, a system can be utilized to implement a method for facilitating distributed well engineering, planning, and/or drilling system design across multiple computation devices where collaboration can occur among various different users (e.g., some being local, some being remote, some being mobile, etc.). In such a system, the various users via appropriate devices may be operatively coupled via one or more networks (e.g., local and/or wide area networks, public and/or private networks, land-based, marine-based and/or areal networks, etc.).

As an example, a system may allow well engineering, planning, and/or drilling system design to take place via a subsystems approach where a wellsite system is composed of various subsystem, which can include equipment subsystems and/or operational subsystems (e.g., control subsystems, etc.). As an example, computations may be performed using various computational platforms/devices that are operatively coupled via communication links (e.g., network links, etc.). As an example, one or more links may be operatively coupled to a common database (e.g., a server site, etc.). As an example, a particular server or servers may manage receipt of notifications from one or more devices and/or issuance of notifications to one or more devices. As an example, a system may be implemented for a project where the system can output a well plan, for example, as a digital well plan, a paper well plan, a digital and paper well plan, etc. Such a well plan can be a complete well engineering plan or design for the particular project.

Figure 4:
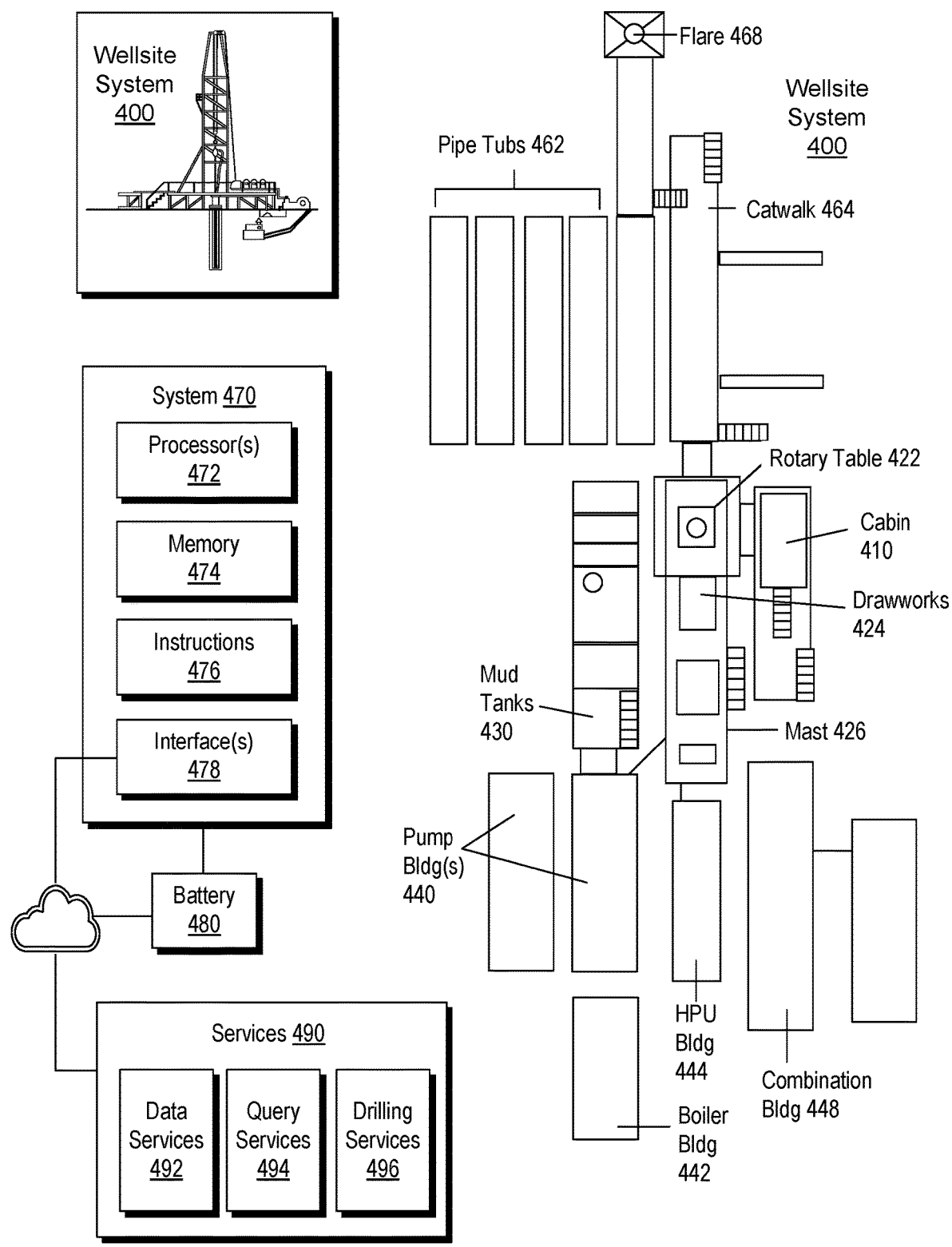
FIG. 4 illustrates an example of a wellsite system and an example of a computing system.

FIG. 4 shows an example of a wellsite system 400, specifically, FIG. 4 shows the wellsite system 400 in an approximate side view and an approximate plan view along with a block diagram of a system 470.

In the example of FIG. 4, the wellsite system 400 can include a cabin 410, a rotary table 422, drawworks 424, a mast 426 (e.g., optionally carrying a top drive, etc.), mud tanks 430 (e.g., with one or more pumps, one or more shakers, etc.), one or more pump buildings 440, a boiler building 442, an HPU building 444 (e.g., with a rig fuel tank, etc.), a combination building 448 (e.g., with one or more generators, etc.), pipe tubs 462, a catwalk 464, a flare 468, etc. Such equipment can include one or more associated functions and/or one or more associated operational risks, which may be risks as to time, resources, and/or humans.

As shown in the example of FIG. 4, the wellsite system 400 can include a system 470 that includes one or more processors 472, memory 474 operatively coupled to at least one of the one or more processors 472, instructions 476 that can be, for example, stored in the memory 474, and one or more interfaces 478. As an example, the system 470 can include one or more processor-readable media that include processor-executable instructions executable by at least one of the one or more processors 472 to cause the system 470 to control one or more aspects of the wellsite system 400. In such an example, the memory 474 can be or include the one or more processor-readable media where the processor-executable instructions can be or include instructions. As an example, a processor-readable medium can be a computer-readable storage medium that is not a signal and that is not a carrier wave.

FIG. 4 also shows a battery 480 that may be operatively coupled to the system 470, for example, to power the system 470. As an example, the battery 480 may be a back-up battery that operates when another power supply is unavailable for powering the system 470. As an example, the battery 480 may be operatively coupled to a network, which may be a cloud network. As an example, the battery 480 can include smart battery circuitry and may be operatively coupled to one or more pieces of equipment via a SMBus or other type of bus.

In the example of FIG. 4, services 490 are shown as being available, for example, via a cloud platform. Such services can include data services 492, query services 494 and drilling services 496. As an example, the services 490 may be part of a system such as the system 300 of FIG. 3.

Figure 5:
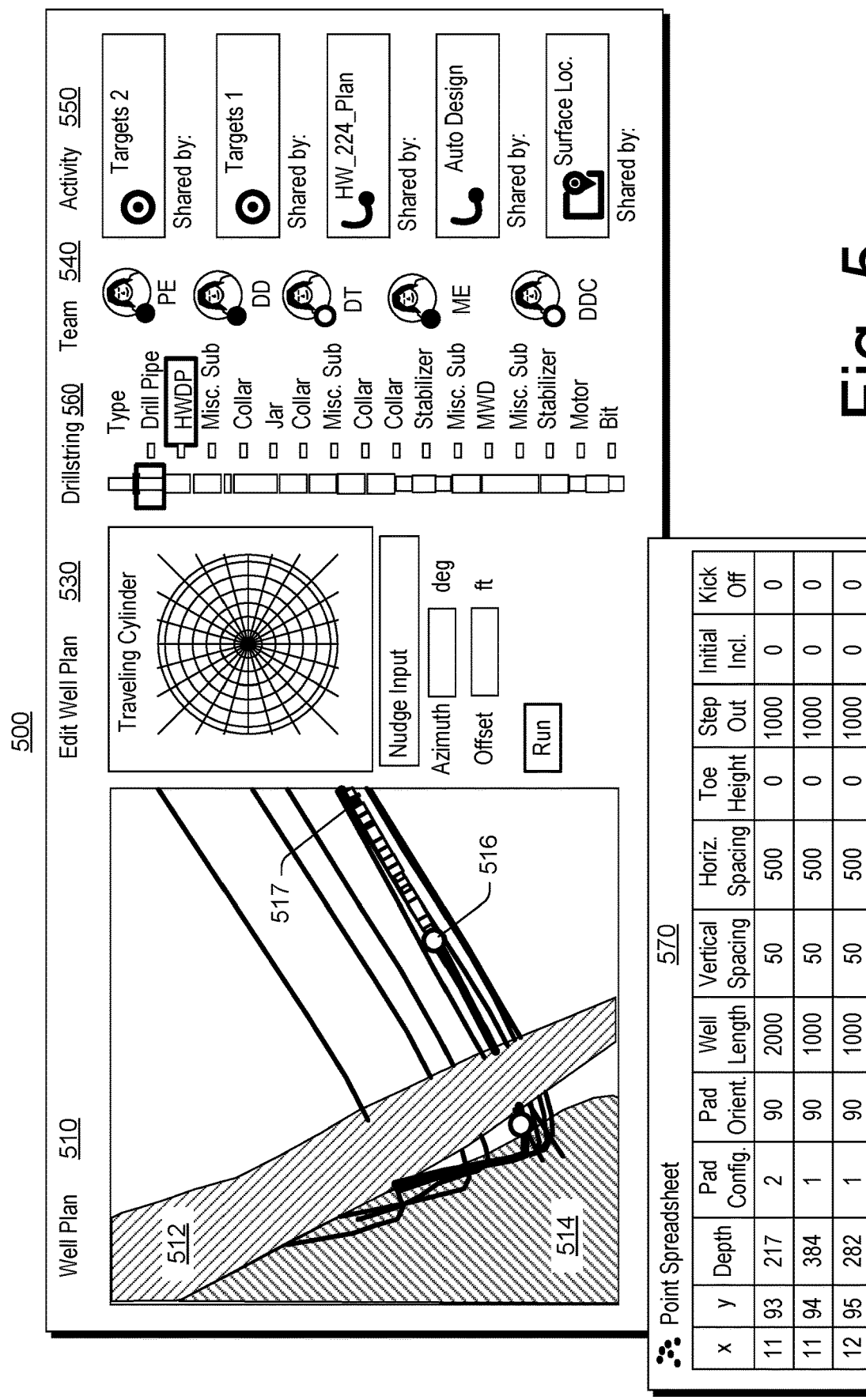
FIG. 5 illustrates an example of a graphical user interface.

FIG. 5 shows an example of a graphical user interface (GUI) 500 that includes information associated with a well plan. Specifically, the GUI 500 includes a panel 510 where surfaces representations 512 and 514 are rendered along with well trajectories where a location 516 can represent a position of a drillstring 517 along a well trajectory. The GUI 500 may include one or more editing features such as an edit well plan set of features 530. The GUI 500 may include information as to individuals of a team 540 that are involved, have been involved and/or are to be involved with one or more operations. The GUI 500 may include information as to one or more activities 550. As shown in the example of FIG. 5, the GUI 500 can include a graphical control of a drillstring 560 where, for example, various portions of the drillstring 560 may be selected to expose one or more associated parameters (e.g., type of equipment, equipment specifications, operational history, etc.). FIG. 5 also shows an example of a table 570 as a point spreadsheet that specifies information for a plurality of wells. As shown in the example table 570, coordinates such as "x" and "y" and "depth" can be specified for various features of the wells, which can include pad parameters, spacings, toe heights, step outs, initial inclinations, kick offs, etc.

In the example of FIG. 5, the drillstring graphical control 560 includes components such as drill pipe, heavy weight drill pipe (HWDP), subs, collars, jars, stabilizers, motor(s) and a bit. A drillstring can be a combination of drill pipe, a bottom hole assembly (BHA) and one or more other tools, which can include one or more tools that can help a drill bit turn and drill into material (e.g., a formation).

Figure 6:
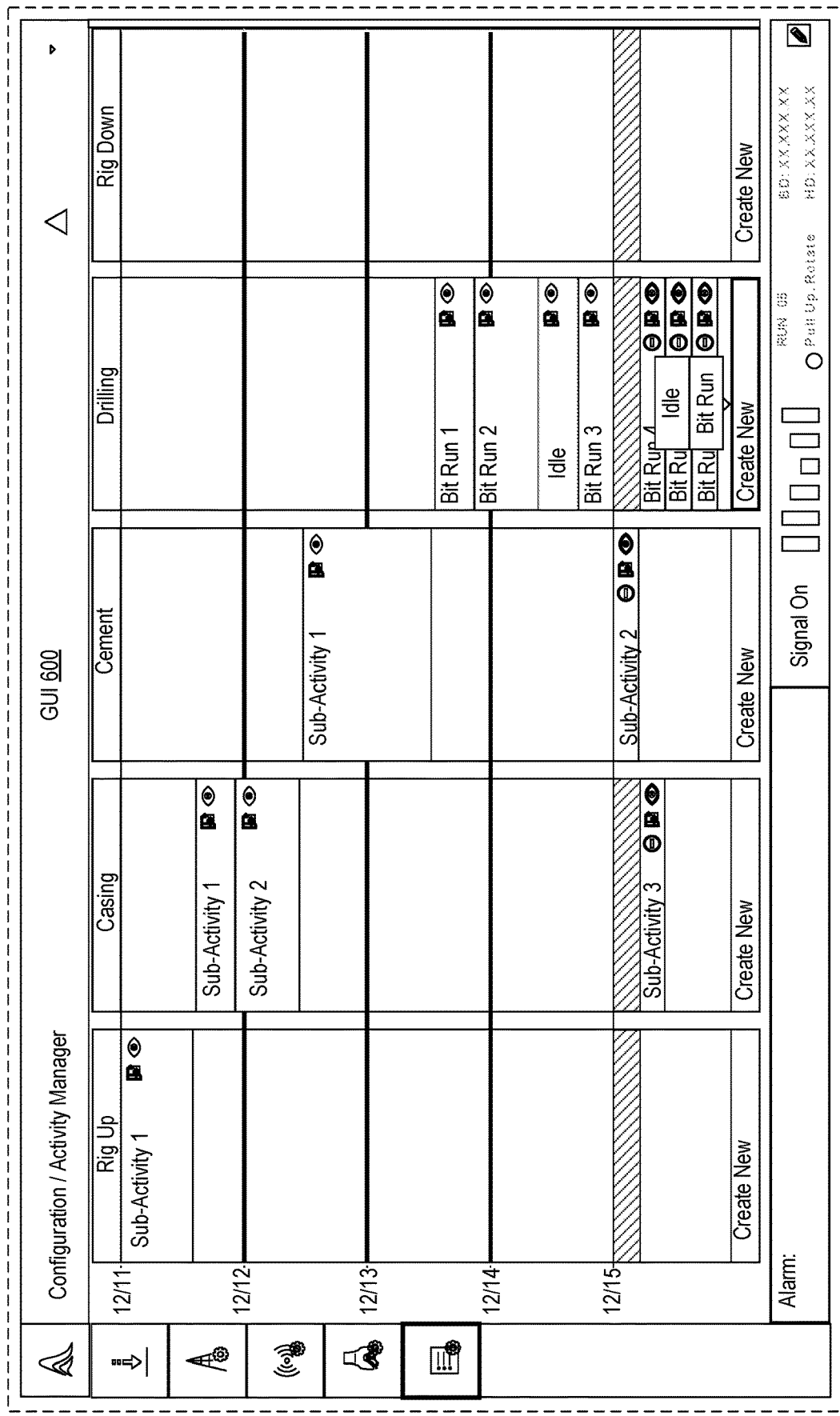
FIG. 6 illustrates an example of a graphical user interface.

FIG. 6 shows an example of a graphical user interface 600 that includes a schedule organized with respect to time (days, dates, etc.) and with respect to various types of operations. The GUI 600 can be part of a well planning system, which may be part of a field development framework. For example, the various operations in the GUI 600 can be implemented to drill at least a portion of a well in a geologic environment (e.g., an oil field or oilfield) where the well may be completed for one or more purposes (e.g., production of hydrocarbons, injection of fluid(s), fracturing of rock, etc.).

As an example, the GUIs 500 and 600 can be part of a field development framework. For example, the well plan 510 of the GUI 500 may be based at least in part on information rendered in the GUI 600. As an example, an interaction with the GUI 500 may be processed by one or more processors to generation information that can be rendered to the GUI 600 and, for example, vice versa.

As mentioned, a framework may be implemented using computing resources (e.g., hardware, communication equipment, etc.) as may be available, for example, in the cloud, a server, a workstation, etc.

As an example, a framework can include components that can take certain inputs and generate certain outputs. The outputs of a component may be used as inputs of another component or other components such that a real-time workflow can be constructed.

FIG. 7 shows an example of a method 700 and an example of a system 790. The method 710 includes a selection block 710 for selecting an operational context (e.g., well construction, etc.), a provision block 720 for provisioning equipment and/or interfaces for purposes of data acquisition and control, a performance block 730 for performing operations based at least in part on a digital plan, and a control block 740 for controlling performance of operations based at least in part on feedback (e.g., based at least in part on acquired data, etc.).

The method 700 is shown as including various computer-readable storage medium (CRM) blocks 711, 721, 731, and 741 that can include processor-executable instructions that can instruct a computing system, which can be a control system, to perform one or more of the actions described with respect to the method 700.

In the example of FIG. 7, a system 790 includes one or more information storage devices 791, one or more computers 792, one or more networks 795 and instructions 796. As to the one or more computers 792, each computer may include one or more processors (e.g., or processing cores) 793 and memory 794 for storing the instructions 796, for example, executable by at least one of the one or more processors 793 (see, e.g., the blocks 711, 721, 731 and 741). As an example, a computer may include one or more network interfaces (e.g., wired or wireless), one or more graphics cards, a display interface (e.g., wired or wireless), etc.

As an example, the method 700 may be a workflow that can be implemented using one or more frameworks that may be within a framework environment. As an example, the system 790 can include local and/or remote resources. For example, consider a browser application executing on a client device as being a local resource with respect to a user of the browser application and a cloud-based computing device as being a remote resources with respect to the user. In such an example, the user may interact with the client device via the browser application where information is transmitted to the cloud-based computing device (or devices) and where information may be received in response and rendered to a display operatively coupled to the client device (e.g., via services, APIs, etc.).

Figure 8:
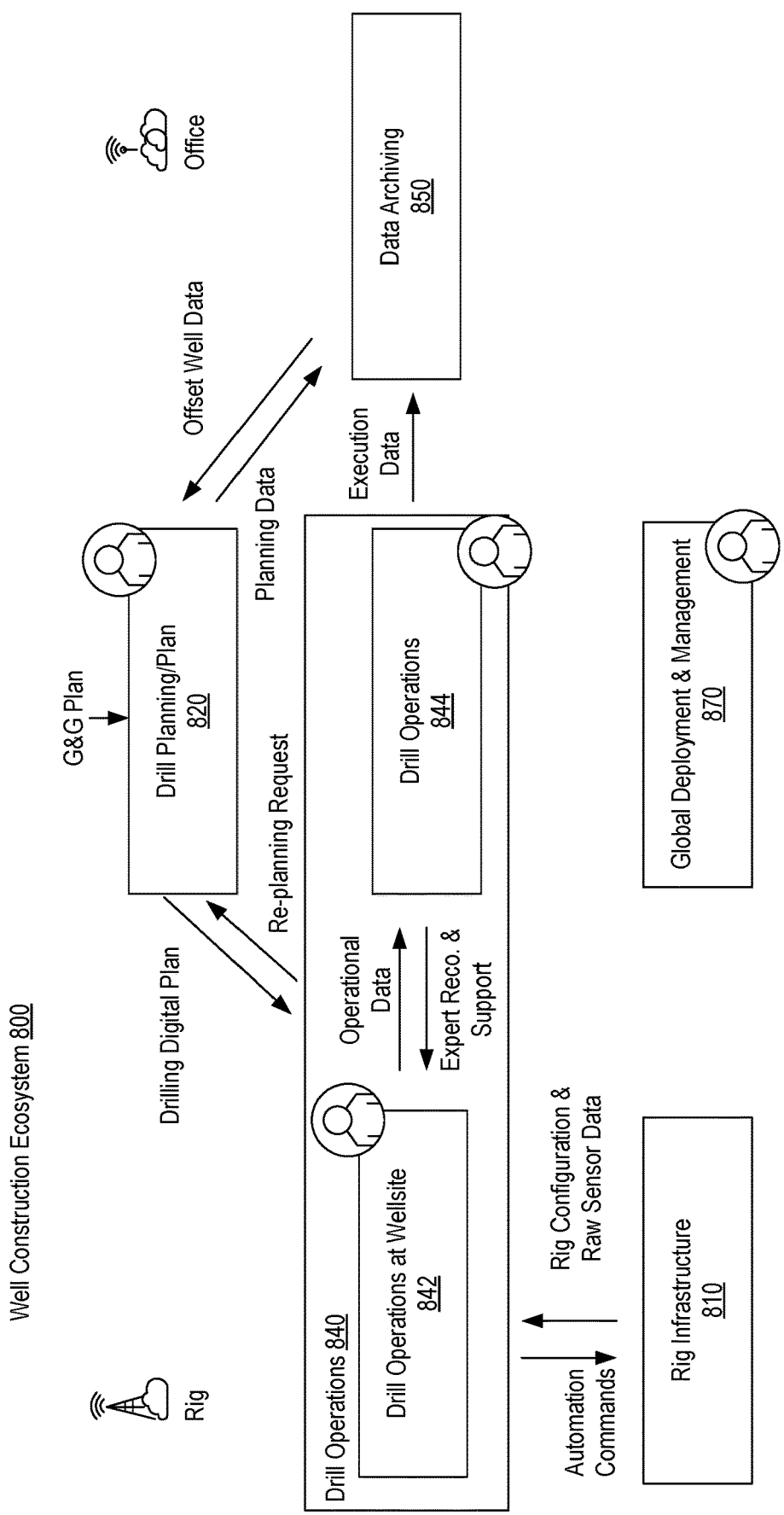
FIG. 8 illustrates an example of a system.

FIG. 8 shows an example of a system 800 that can be a well construction ecosystem. As shown, the system 800 includes rig infrastructure 810 and a drill plan component 820 that can generation or otherwise transmit information associated with a plan to be executed utilizing the rig infrastructure 810, for example, via the drilling operations layer 840, which includes a wellsite component 842 and an offsite component 844. As shown, data acquired and/or generated by the drilling operations layer 840 can be transmitted to a data archiving component 850, which may be utilized, for example, for purposes of planning one or more operations (e.g., per the drilling plan component 820.

An example of the system 800 of FIG. 8 is described in a US Provisional Application having Ser. No. 62/670,803 filed 13 May 2018, which is incorporated by reference herein. This is further described in the application with international application no. PCT/US2019/031641, filed 10 May 2019 which is also incorporated by reference.

Figure 9:
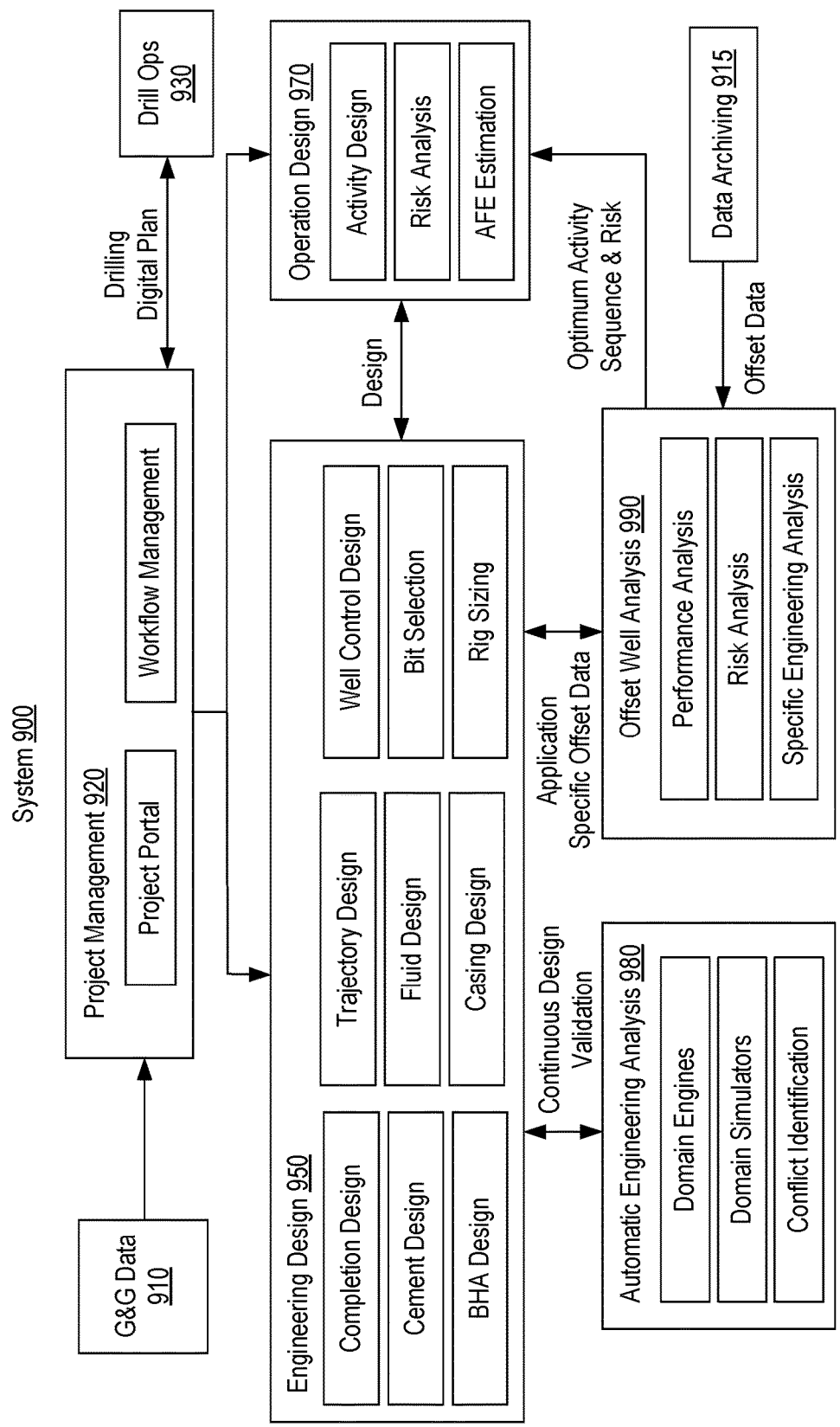
FIG. 9 illustrates an example of a system.

FIG. 9 shows an example of a system 900 that includes data 910 that can be received by a project management component 920 via a project portal where the component 920 includes workflow management features, which can include features that operate on the data 910 to generate a digital plan such as a drilling digital plan, which may include executable instructions to control one or more pieces of equipment at a rigsite. As shown, the digital plan may be transmitted to a drilling operations component 930 (see, e.g., the layer 840 of FIG. 8).

In FIG. 9, the project management component 920 can output information to an engineering design component 950 and an operational design component 970, which include various features as to physical equipment that can be utilized to drill a well. The components 950 and 970 can be operatively coupled to analysis components such as an automatic engineering analysis component 980 and an offset well analysis component 990, which may receive information from a data archiving component 915 (e.g., a data storage that includes information organized with respect to offset wells, etc.). As shown in FIG. 9, the components 950 and 970 can be operatively coupled, for example, to facilitate design of equipment that comports with operational conditions (e.g., activities, risk, etc.). As an example, during a process, such as building a drillstring, engineering analyses may be ongoing, optionally automatically such that design considerations for a particular well are taken into account during the building of the drillstring (e.g., an actual drillstring, a plan for a drillstring, etc.). As an example, offset data may be provided on a real-time basis as it becomes available and utilized for purposes of engineering analyses, for example, to account for information gained through drilling at an offset site.

Figure 10:
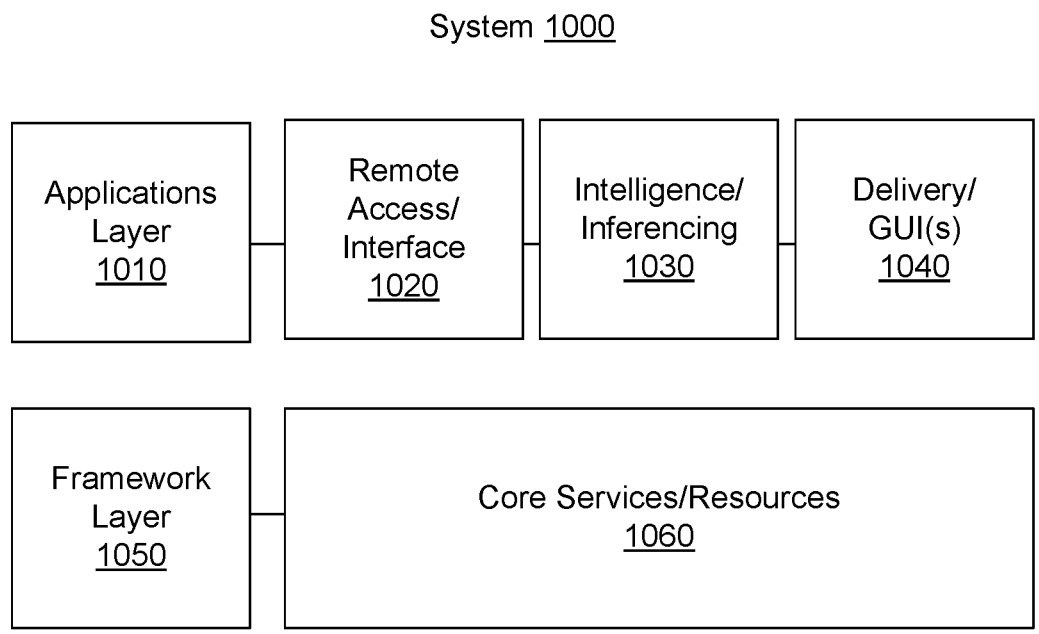
FIG. 10 illustrates an example of a system.

FIG. 10 shows an example of a system 1000 that includes various layers and operational blocks, including an applications layer 1010 that can include a remote access and interface block 1020 (e.g., for access to interfaces of rigsite equipment from one or more remote locations, etc.), an intelligence and inferencing block 1030 (e.g., resources optionally remote from a rigsite, etc.), an applications delivery and/or GUIs block 1040 (e.g., optionally including one or more application programming interfaces, etc.), and a framework layer 1050 that includes a core services and/or resources block 1060.

In the example of FIG. 10, the applications layers 1010 can include various applications that can be executable using one or more of the framework layer 1050 resources. Such applications can include, for example, applications that operate locally, remotely and/or a combination of remotely and locally.

As an example, the system 1000 of FIG. 10 can be utilized as part of a drilling operations layer such as the layer 840 of FIG. 8. For example, the system 1000 of FIG. 10 may be the offsite component 844 (e.g., office site operations control, management, etc.).

Figure 11:
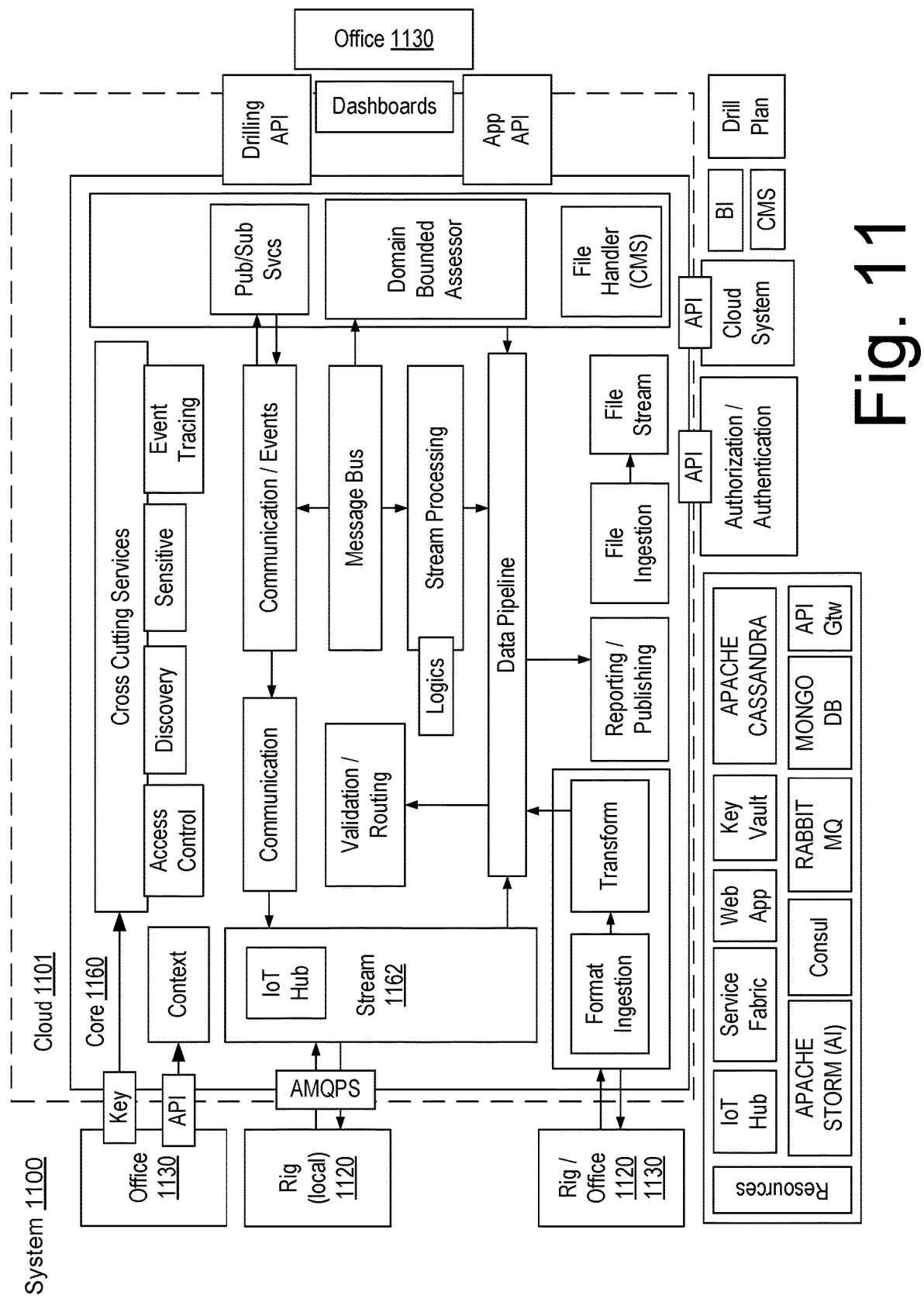
FIG. 11 illustrates an example of a system.

FIG. 11 shows an example of a system 1100 that may be implemented, at least in part, via cloud resources 1101. In the example of FIG. 11, locations are indicated such as by a rig 1120 and an office 1130 where the rig 1120 can be a rigsite location or locations of rigsites and where the office 1130 can be an office location or locations of offices where an office may be at a rigsite or at another site, which may be remote from the rigsite.

As shown in FIG. 11, the office 1130 may access a core 1160 via the cloud resources 1101 via one or more mechanisms such as via one or more security mechanisms (e.g., security protocol(s) that may rely on a key or keys for authentication, etc.) and one or more application programming interfaces (APIs). As an example, an API can provide for making a call and receiving information responsive to the call. A call may include information that is utilized to determine what information is to be returned responsive to the call. As an example, a local API call may be from an application to an operating system where the API exposes one or more OS functionalities (e.g., access to hardware states, etc.). In a client-server architecture, a call transmitted from a client device to a server device may include information that is utilized by the server device to determine what information to package in a response and/or, for example, utilized to issue a signal to one or more pieces of equipment (e.g., a control signal, etc.). Remote APIs may be implemented to maintain object abstraction in object-oriented programming. For example, a method call, executed locally on a proxy object, can be utilized to invoke a corresponding method on a remote object, using the remoting protocol, and to acquire the result to be used locally as return value.

In the example of FIG. 11, the office 1130 may access the core 1160 via various features in one or more manners (see, e.g., the offices 1130 to the left and the office 1130 to the right). As an example, the office 1130 or offices 1130 may access the core 1160 for utilization of one or more intelligence and/or inferencing features such as indicated by the intelligence and inferencing block 1030 of the system 1000 of FIG. 10.

As to the rig 1120, it may be operatively coupled to the core 1160 via one or more features such as the access and interface features 1020 of the system 1000 of FIG. 10. As an example, the rig 1120 may be operatively coupled to the core 1160 via the Advanced Message Queuing Protocol (AMQP), which may be implemented in a secure manner (e.g., AMQPS). Such a protocol can operate as an application layer protocol for message-oriented middleware, etc. Features of AMQP include message orientation, queuing, routing (e.g., including point-to-point and publish-and-subscribe), reliability and security.

AMQP mandates the behavior of the messaging provider and client to the extent that implementations from different vendors are interoperable (e.g., akin to SMTP, HTTP, FTP, etc. for interoperable systems). Another approach may utilize a technology such as JAVA messaging service (JMS), which defines an API and a set of behaviors that a messaging implementation is to provide. Specifically, JMS is an API specification (part of the Java EE specification) that defines how message producers and consumers are implemented; whereas, AMQP is considered to be a wire-level protocol. A wire-level protocol is a description of the format of the data that is sent across the network as a stream of bytes. Consequently, a tool that can create and interpret messages that conform to this data format can interoperate with another compliant tool irrespective of implementation language.

As shown in the example of FIG. 11, the operative coupling of the rig 1120 can provide for an Internet of Things (IoT) scenario where, for example, various pieces and/or groups of equipment at a rigsite can be provisioned for purposes of data receipt and/or transmission, which may occur, for example, via an AMQP approach.

As shown in the example of FIG. 11, communications can be routed to a stream block 1162 that may host an "Internet of Things" (IoT) directory, for example, of provisioned equipment (e.g. data acquisition units, control units, etc.). Such communications may be output to the rig 1120 for purposes of onsite instructing of equipment and/or people. As an example, output may be a control signal that causes a piece of drilling equipment or other rigsite equipment to perform an action (e.g., a controlled action). As shown in the example of FIG. 11, the stream block 1162 can provide data to a data pipeline that is operatively coupled to other resources within the core 1160. For example, the data pipeline may receive information that may be in a particular format (e.g., Digital Log Information Standard (DLIS), Energistics Transfer Protocol (ETP), Wellsite Information Transfer Standard Markup Language (WITSML), etc.).

As to examples of resources, which may be cloud resources, database resources, intelligence resources (e.g., AI, etc.), inference resources, security resources, etc., the example of FIG. 11 shows APACHE resources (Apache Software Foundation, Forest Hill, Maryland) that include CASSANDRA database resources and STORM artificial intelligence (AI) resources. The CASSANDRA resources may include a query language (CQL), which offers a model akin to SQL in the sense that data are put in tables containing rows of columns. As to STORM resources, a system can include an analysis engine, which may include a Bayesian network, which may operate as to making inferences based on historical data, modeled data, etc.

As an example, a method can include identifying one or more types of events by implementing a topology that includes a directed acyclic graph. For example, the STORM application can include utilization of a topology that includes a directed acyclic graph (DAG). A DAG can be a finite directed graph with no directed cycles that includes many vertices and edges, with each edge directed from one vertex to another, such that there is no way to start at any vertex v and follow a consistently-directed sequence of edges that eventually loops back to v again. As an example, a DAG can be a directed graph that includes a topological ordering, a sequence of vertices such that individual edges are directed from earlier to later in the sequence. As an example, a DAG may be used to model different kinds of information.

Another resource is RABBITMQ (Pivotal Software, San Francisco, California), which is a message broker resource (e.g., message-oriented middleware) that implemented the Advanced Message Queuing Protocol (AMQP) and has been extended with a plug-in architecture to support Streaming Text Oriented Messaging Protocol (STOMP), MQTT, and other protocols.

Another resource is MONGODB (MongoDB Inc., New York, New York), which is a cross-platform document-oriented database program. Classified as a NoSQL database program, MONGODB uses the JAVASCRIPT Object Notation (JSON) format-like documents with schemas. As an example, the JSON format may be utilized for one or more purposes in a system such as the system 1100. For example, consider specifying data, specifying interactions, etc., in a client-server type of architecture (e.g., frontend/backend, etc.) using the JSON format.

Figure 12:
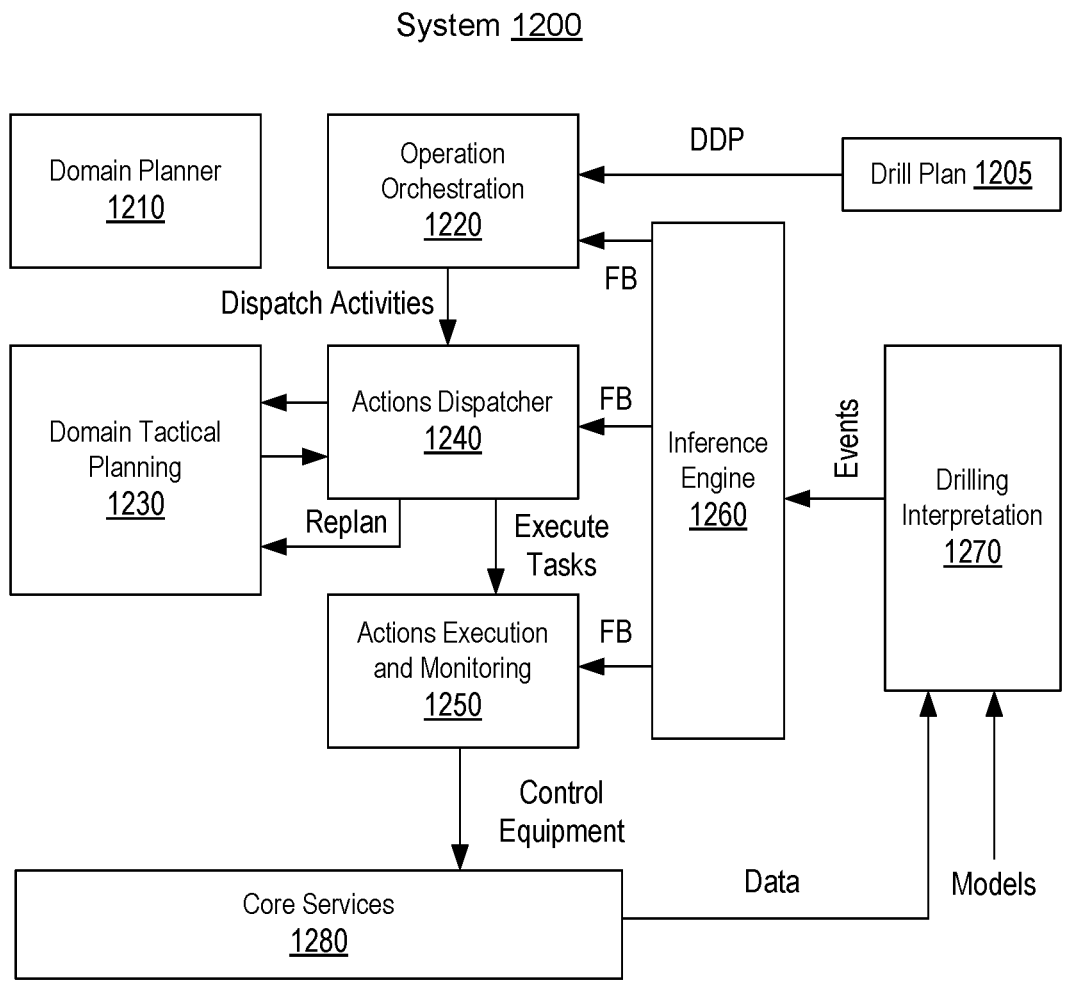
FIG. 12 illustrates an example of a system.

FIG. 12 shows an example of a system 1200 that includes various blocks including a digital drill plan (DDP) block 1205, a domain planner block 1210, an operation orchestration block 1220, a domain tactical planning block 1230, an actions dispatcher block 1240, an actions execution and monitoring block 1250, an inference engine block 1260, a drilling interpretation block 1270, and a core services block 1280.

As shown in FIG. 12, various arrows indicate some examples of actions that can be performed utilizing the system 1200. In the example of FIG. 12, the inference engine 1260 can provide feedback (FB) based at least in part on events as may be provided as output via the drilling interpretation block 1270. As shown, the drilling interpretation block 1270 can receive data and one or more models (e.g., as to one or more drilling operations, production, injection, materials modeling, fluids modeling, etc.). As shown data may be provided via the core services block 1280 (see, e.g., core services 1060 and 1160 of FIGS. 10 and 11).

The system 1200 can include features for dispatching activities, for example, via the operation orchestration block 1220, which may dispatch activities in response to information (e.g., instructions, etc.) in the digital drill plan block 1205 (e.g., consider executable commands, instructions, etc., as may be specified in a digital drill plan, which may be a digital well plan as explained with respect to FIG. 6 where various activities are illustrated in the GUI 600).

The system 1200 can include features for execution of activities, which may be classified as tasks. In such an example, the domain tactical planning block 1230 may act to receive activities and to output tasks based on the activities. As an example, the actions dispatcher block 1240 can provide logic that requests replanning of tasks and/or activities, which may occur responsive to feedback (FB) as provided via the inference engine block 1260. For example, equipment at a rigsite may transmit (e.g., via pull and/or push) data to the core services block 1280 where the data are received via the drilling interpretation block 1270, which may utilize one or more models to interpret at least a portion of the data based at least in part on one or more of the one or more models. In such an example, one or more events may be output where such one or more events are received by the inference engine block 1260, which can infer how such one or more events may impact activities and/or tasks. As the actions dispatcher block 1240 is responsible for dispatching, the inference engine block 1260 can output feedback as information that may, for example, call for replanning (e.g., via the domain tactical planning block 1230). In such an example, real-time operations can be controlled with one or more feedback loops as tasks are executed and data are acquired and received at a rigsite by one or more pieces of equipment.

In the example of FIG. 12, the inference engine block 1260, which may include one or more features of the APACHE STORM resources, can be cast in a drilling operations context as informed by the drilling interpretation block 1270. For example, the drilling interpretation block 1270 can inform an inference engine such that inferences are made in the context of drilling operations.

While the foregoing example refers to output of the inference engine block 1260 to the actions dispatcher block 1240, as shown in FIG. 12, the inference engine block 1260 can provide feedback to one or more other blocks. For example, the inference engine block 1260 can provide feedback to the operations orchestration block 1220 and/or the actions execution and monitoring block 1250. In such an example, an informed inference engine can be cast in the context of drilling operations such that inferences, which can be data-based and/or model-based inferences, can affect control of equipment at one or more levels of the system 1200. Such an approach provides for multi-level robustness such that data from equipment at one or more rigsites can inform drilling operations, optionally in real-time.

Figure 13:
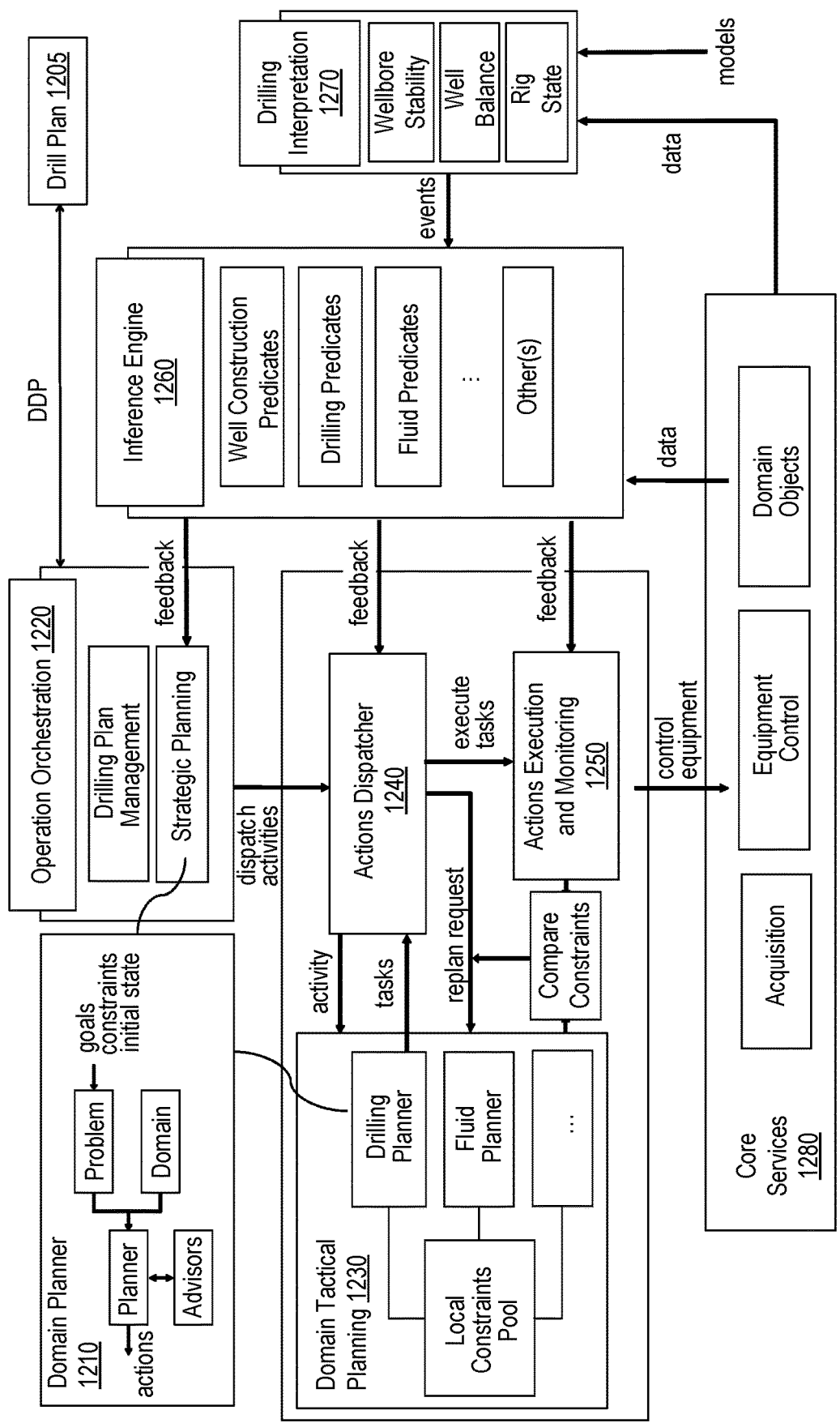
FIG. 13 illustrates an example of the system of FIG. 12.

FIG. 13 shows an example of an implementation of the system 1200 of FIG. 12, with various examples of components and features. The example of FIG. 13 shows the various blocks 1210, 1220, 1230, 1240, 1250, 1260, 1270 and 1280 with respect to the digital drill plan block 1205. The blocks can be components of a computational system.

As shown in FIG. 13, the domain tactical planning block 1230 can include a local constraints pool. In such an example, constraints may be provided by one or more entities where, for example, the constraints may pertain to one or more of policies, standards, procedures, and guidelines. As an example, a component of a system may fuse information from different entities to generate constraints, which may be utilizes to output tasks, replan tasks, set limits, set work instructions, output checklists, etc. As an example, the actions execution and monitoring block 1250 can output information that may be compared to one or more constraints. As shown in the example of FIG. 13, a comparison of constraints between those of tactical planning values, ranges, etc., and actual values, ranges, etc., may trigger a replan request and/or one or more other actions. For example, consider a constraint on mud flow rate per a procedure of an entity where monitoring of mud flow rate indicates that mud flow rate exceeded the constraint (e.g., as an upper limit constraint) or fell below the constraint (e.g., as a lower limit constraint). In such an example, the system 1200 may identify the source of the constraint and determine whether a replan or other action is warranted. For example, a notification may be issued for an operator to review the numeric values in light of a procedure specified by an entity to determine whether the result of the comparison warrants action (e.g., replanning, etc.). As an example, a hierarchical, tiered structure may be utilized to assess one or more procedures, activities, tasks, etc., which may be in view of a tiered structure of policies, standards, procedures and guidelines as may be specified by one or more entities. Such a linking of field operations to entity information can provide for tracing backwards, forwards, etc., to determine if an entities goals are met in a well construction project, to identify whether data indicate that a goal may or may not be met, etc.

Figure 14:
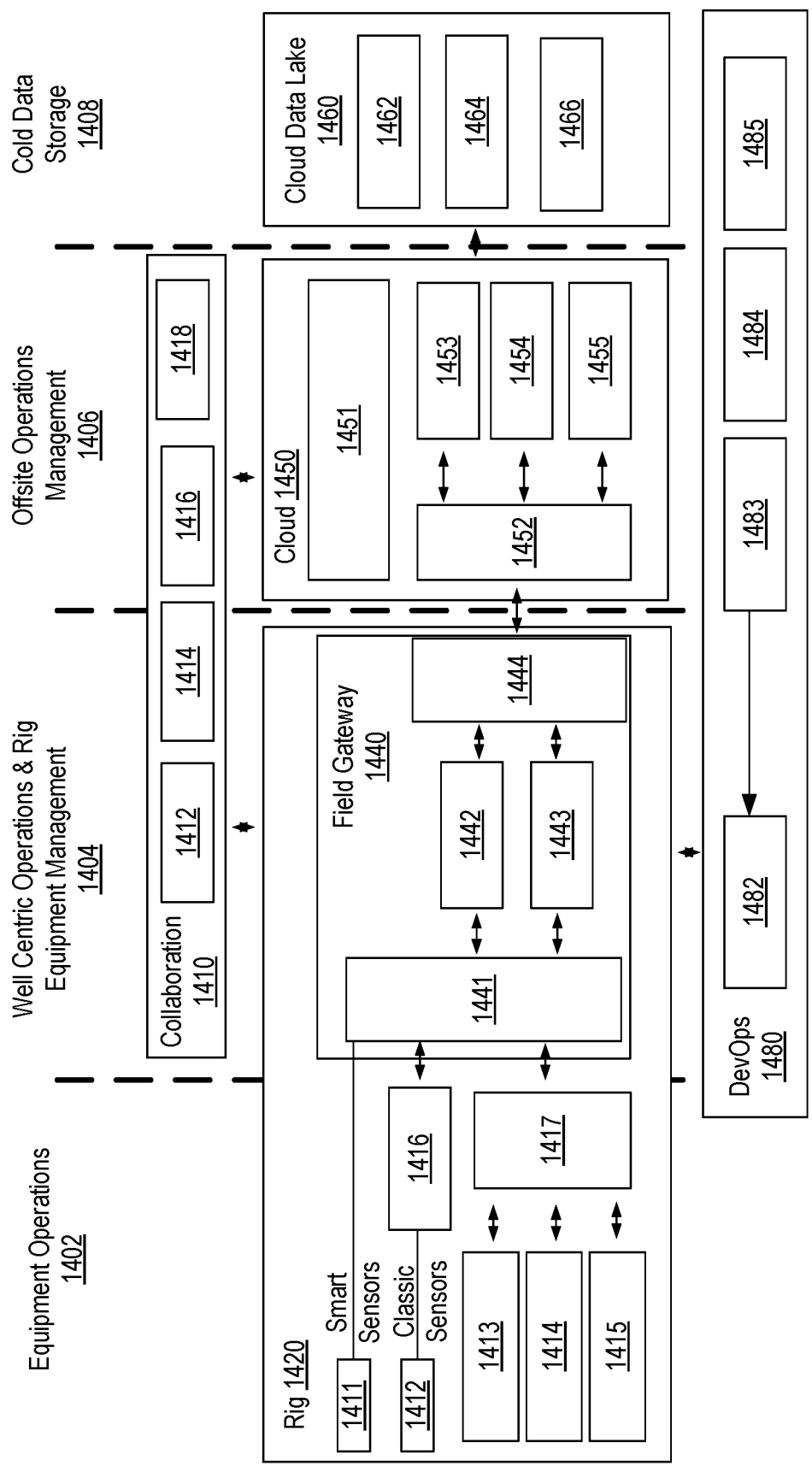
FIG. 14 illustrates an example of a system.

FIG. 14 shows an example of a system 1400 that includes various layers of organization including equipment operations 1402, well centric operations and rig equipment management 1404, offsite operations management 1406 and cold data storage 1408.

As shown, the system 1400 includes a collaboration framework 1410 with components 1412, 1414, 1416 and 1418 for messaging, CMS, BI, and reporting, respectively.

As shown, the system 1400 includes rig equipment 1420 including sensors 1411 and 1412, a rig control system 1413, a fluid control system 1414, one or more other systems 1415, data acquisition hardware 1416 coupled to sensors, an equipment control interface 1417, and a field gateway 1440 that includes an equipment gateway 1441, an asset centric processing component 1442, a well centric processing component 1443 and a cloud gateway 1444 that can operatively couple the rig equipment 1420 to cloud resources.

As shown in FIG. 14, the system 1400 includes cloud resources 1450, including operation planning resources 1451, an Internet-of-Things (IoT) hub 1452, asset centric processing 1453, well centric processing 1454 and rig operations provisioning (e.g., for provisioning resources, etc.).

The system 1400 in FIG. 14 is shown as including or otherwise being operatively coupled to a data storage such as a cloud data lake 1460, which can include a drilling data pond 1462, an IT data lake 1464, and an E&P data lake 1466.

The system 1400 includes various development operations features as may be available via a development operations framework 1480. Such features can include deployment features 1483, infrastructure monitoring features 1484, and configuration management features 1485.

Figure 15:
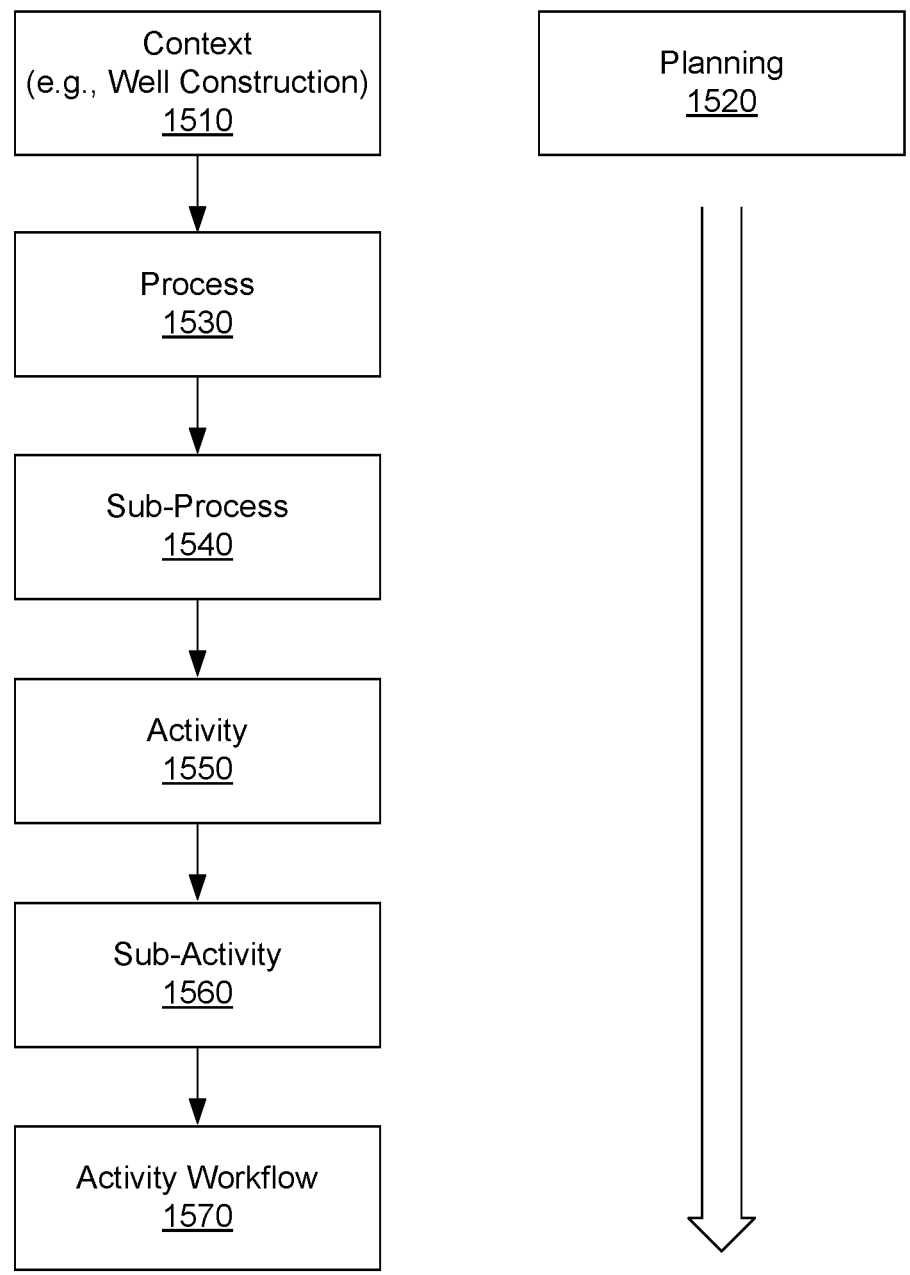
FIG. 15 illustrates an example of a method.

FIG. 15 shows an example of a method 1500 that may implement a system such as, for example, the system 1200 of FIG. 12, the system of 1000 of FIG. 10 and/or the system 1100 of FIG. 11.

In FIG. 15, the method 1500 is in the context of constructing a well, which may be specified, for example, in a digital drill plan or digital well plan (see, e.g., the digital drill plan block 1205 of FIG. 12, the GUI 600 of FIG. 6, etc.).

In the method 1500, a context block 1510 provides the context of constructing a well while a parallel process or processes occur via a planning block 1520, which can provide on-going planning (e.g., and/or replanning) during a well construction process per the context block 1510.

As shown, the method 1500 includes a process block 1530, a sub-process block 1540, an activity block 1550, a sub-activity block 1560, and an activity workflow block 1570. Such blocks can be associated with various blocks of the system 1200, which, as mentioned, can provide for real-time operations associated with a rigsite, which can include drilling operations.

The method 1500 may be performed, at least in part, in a hierarchal manner. For example, the method 1500 may include tiers or levels where various planning processes may operate at corresponding tiers or levels, optionally in a cross-sectional manner such that a change at one tier or level can be propagated (e.g., affect) one or more aspects of another tier or level.

As an example, a system can include or be operatively coupled to a planning framework, which can include implementation of one or more planning domain definition languages (PDDLs). An article by Fox, M., and Long, D. 2003. PDDL2.1: An extension to PDDL for expressing temporal planning domains. Journal of Artificial Intelligence Research 20 (2003) 61-124, is incorporated by reference herein. As an example, the domain tactical planning block 1230 of the system 1200 of FIG. 12 can include or be operatively coupled to a planning framework that utilizes one or more PDDLs.

As illustrated in the example method 1500 of FIG. 15, well construction can be planned to generate a plan that may be suitable for execution. During execution, circumstances (e.g., events, conditions, etc.) may change such that there is a deviation from a generated plan. As an example, a planning framework may be operable to generate a plan and to replan, whether during a planning phase and/or during an execution phase.

As illustrated in the example of FIG. 15, well construction can include various activities that can be organized into levels or tiers. As an example, a well construction project can be defined using one or more flow-charts of activities where at least some of the activities can be performed at least in part using equipment at a wellsite. For example, consider a wellsite system (e.g., or rigsite system) such as the wellsite system 200 of FIG. 2, wellsite system 400 of FIG. 4, etc.; noting that an offshore wellsite system may be utilized. As to equipment at a wellsite that may be controlled using instructions within a digital well plan generated by a planning process (e.g., optionally using a planning framework, etc.), consider the mud pump 204, the drawworks 207, the rotary table 220, and the top drive 240. Such equipment may be operated, for example, to drill ahead in a borehole where drilling ahead is to construct a section of a planned well. Such equipment may be operated according to a digital well plan that is formulated using constraints as may be from one or more sources (e.g., an entity, equipment, formation characteristics, etc.). A top drive may be operated to achieve a certain amount of surface torque that translates into rotational speed of a bit at an end of a drillstring, a mud pump may be operated to achieve a desired removal rate of cuttings from drilling, and a drawworks may be operated to achieve a desired weight on the bit during drilling. As an example, a digital well plan can include data structures that represent corresponding activities where such data structures can include or be associated with one or more processes that may be tailored for performance using particular equipment. As to constraints, a constraint may flow from an entity (e.g., a field services provider, a regulator, etc.) to a digital well plan and an activity data structure therein and/or a constraint may flow from equipment to a digital well plan. While the method 1500 of FIG. 15 is illustrated as including planning from the context block 1510 downwards to the activity workflow block 1570, constraints that affect planning of the planning block 1520.

As an example, one or more workflows can be modeled using Planning Domain Description Language (PDDL) as a temporal planning problem. As an example, a planning engine of a planning framework can take a PDDL model as input, description of the current state of the processing, machines, human workers and compute a plan that suggests order of performing activities.

As an example, a plan can be a machine-readable file or files that is or are executed by a component such as a plan dispatcher or actions dispatcher (see, e.g., the actions dispatcher 1240 of the system 1200 of FIG. 12). Such a plan may be described with appropriate conditions that are to be monitored by a monitoring component (see, e.g., the actions execution and monitoring component 1250 of the system 1200 of FIG. 12) to ensure constraints are respected, where constrains may include static constraints and dynamic constraints. As an example, a dynamic constraint may arise responsive to monitoring, for example, where logging while drilling determines that a formation characteristic has changed in a manner that may not be adequately accounted for in a plan. As illustrated in the system 1200 of FIG. 12, a comparison block can be utilized to trigger a replan request, which may be triggered by a new constraint, data that indicates a deviation from an existing constraint, etc. In such an example, the system 1200 may operate dynamically responsive to one or more changes in circumstances.

FIG. 16 shows an example of a method 1600 and an example of a graphical user interface (GUI) 1690. As shown, the method 1600 includes prescriptive blocks 1610 and 1630 and a dynamic block 1620. Such blocks may be associated with various blocks of the method 1500 of FIG. 15. For example, the process block 1510, the sub-process block 1530 and the activity block 1540 may be associated with the prescriptive block 1610 and the activity workflow block 1570 may be associated with the dynamic block 1620, while operational tasks as part of an activity workflow may be associated with the prescriptive block 1630.

As to the GUI 1690, it includes the blocks 1610, 1620 and 1630 as arranged with respect to swim lanes. As shown, the dynamic block 1620 can include various maps with respect to time that correspond to dynamic sequences of tasks. As an example, a map can include information that relates to a software instruction (SWI) such as a machine readable command, signal, etc., that can be issued to one or more pieces of equipment to perform one or more actions. As mentioned, an action can be based on a constraint and/or can be constrained. As an example, an action may be to perform a flow check at intervals of 24 hours and/or at intervals of 500 feet of drilled borehole. In such an example, the two different constraints may be from two different sources, which are to be adhered to and/or reconciled. As an example, instructions can be generated and utilized to control equipment, to issue a notice, etc., such that well construction complies with the foregoing constraints. As an example, where 500 feet of drilled borehole occurs in less than 24 hours, drilling may be stopped and a flow check action performed and a timer reset for 24 hours to address the non-triggered constraint. As an example, a replan request may be issued that can replan a digital well plan as to the 24 hour constraint such that it is positioned within a dynamic sequence of tasks with associated instructions generated for execution to perform the activity at the appropriate time, unless another 500 feet of drilled borehole occurs prior to 24 hours passing. In such an example, one of the constraints has more uncertainty than the other one of the constraints. As an example, a planning framework may be implemented to generate estimates of time or to utilize estimates of time to determine whether one constraint or the other is more likely to trigger the flow check action. As mentioned, where sensor data indicates that a drilling rate (e.g., rate of penetration, ROP) is decreasing to an extent that 500 feet of drilled borehole is unlikely to occur in a 24 hour period, a dynamic sequence of tasks as in the GUI 1690 may be updated and appropriate instructions issued, staged, etc., such that the flow check occurs responsive to a 24 hour timer (e.g., or a lesser time that builds in a safety margin).

Figure 27:
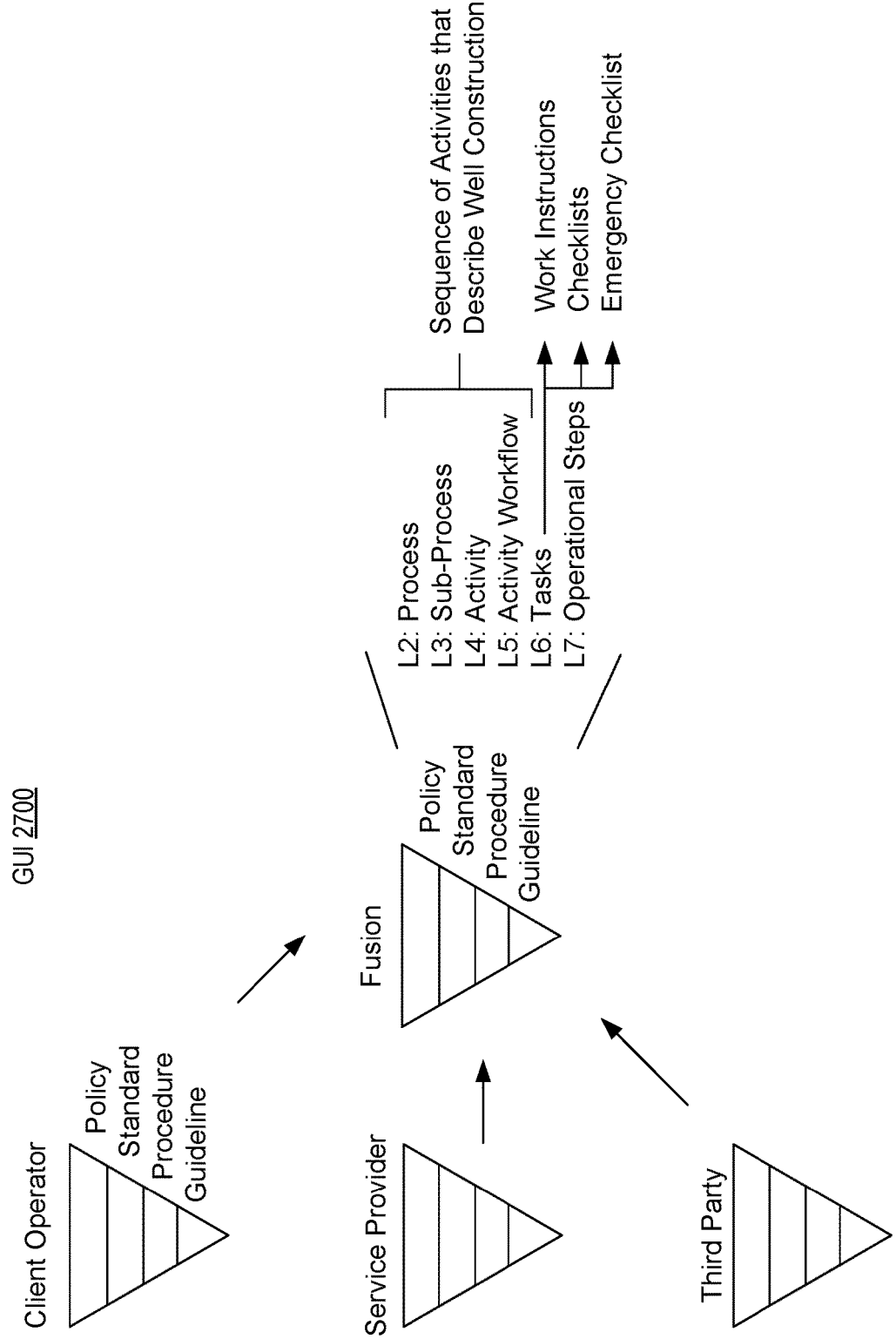
FIG. 27 illustrates an example of a graphical user interface.

As an example, the GUI 1690 may render one or more notifications to a display that may indicate when a policy, a standard, a procedure, a guideline may be at risk of non-compliance (see, e.g., the GUI 2700 of FIG. 27). In such an example, a user may interrogate the reason for the risk of non-compliance. For example, consider clicking on one of the graphics in the GUI 1690 to access and render information provided by an entity or entities that may have given rise to a constraint. As an example, one constraint for an activity may remain in compliance while another falls out of compliance. As an example, a reporting feature may mark such instances and circumstances that caused an out-of-compliance occurrence. As an example, as mentioned with respect to the system 1200 of FIG. 12, a condition related to one or more constraints may be sufficient to trigger a replan request, which may dynamically replan one or more aspects of a well construction plan, which may then be updated in a GUI such as the GUI 1690 of FIG. 16.

Figure 17:
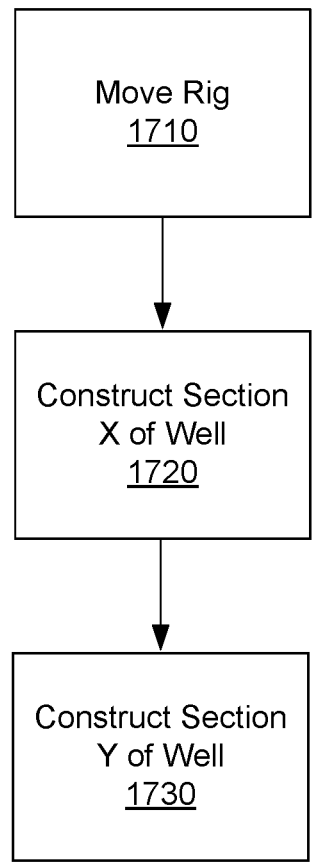
FIG. 17 illustrates an example of a method.

FIG. 17 shows an example of a method 1700 that is directed to a particular sub-process in the context of well construction, as illustrated in the example of FIG. 15. As shown, at a sub-process tier or level, the method 1700 can include a movement block 1710 for moving a rig (e.g., to a rigsite), a construction block 1720 for constructing a section X of a well at the rigsite utilizing the rig, and a construction block 1730 for constructing another section Y of the well at the rigsite utilizing the rig. The blocks 1710, 1720 and 1730 may be performed according to one or more constraints, which may pertain to one or more goals. For example, consider a human safety goal and/or an equipment safety goal. Such goals may be based at least in part on information received from one or more entities as, for example, one or more of policies, standards, procedures or guidelines. As an example, to achieve a goal, a constraint may be to limit the ground speed of a part of the rig equipment to being less than X kph while another goal may be a time-based goal where a minimum ground speed is to be at least Y kph where X is greater than Y. As explained with respect to the example of FIG. 13, monitoring may occur where ground speed can be determined and compared to a constraint where a result of a comparison may be utilized for one or more purposes (e.g., notifications, replanning, etc.).

Figure 18:
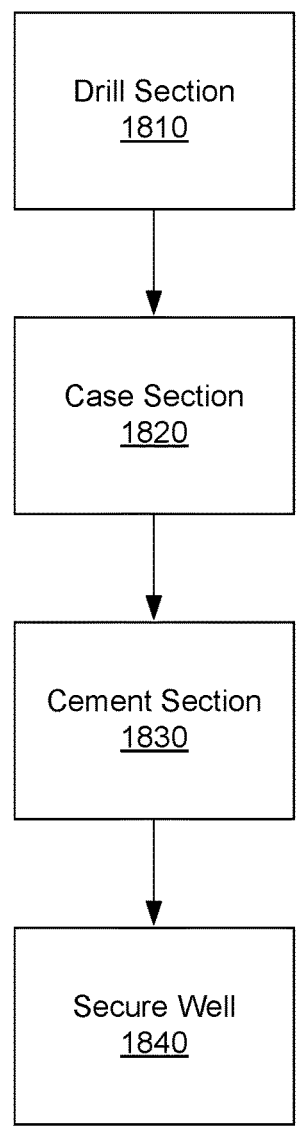
FIG. 18 illustrates an example of a method.

FIG. 18 shows an example of a method 1800 that is directed to a particular activity in the context of well construction, as illustrated in the example of FIG. 15. As shown, at an activity tier or level, the method 1800 can include a drill block 1810 for drilling a section of a well (e.g., section X, section Y, etc.), a case block 1820 for casing a section of a well that has been drilled, a cement block 1830 for cementing a section of a well (e.g., a cased section of a well), and a secure block 1840 for securing a section of a well. As an example, the method 1800 may be implemented a plurality of times for a plurality of sections (e.g., section X, section Y, etc.). As an example, the method 1800 may be performed using information received from one or more entities where such information may be translatable into one or more goals, one or more constraints, etc.

As mentioned, a method can include replanning. For example, in response to data and/or modeling, one or more events may be directed to an inference engine, which can provide feedback to one or more portions of a system such as the system 1200 of FIG. 12. In such an example, one or more activities may be effected and result in one or more activities being changed and/or one or more tasks being changed (see, e.g., the domain tactical planning block 1230, which may respond to a call from the actions dispatcher block 1240 to replan an activity and/or a task, which may affect one or more other activities and/or tasks, etc.). As shown, a system may implement logic, which may be model-based logic, which can provide a logical model as to how a well is constructed, as illustrated in FIG. 18 at a particular level of granularity (e.g., a tier of specificity, etc.).

Figure 19:
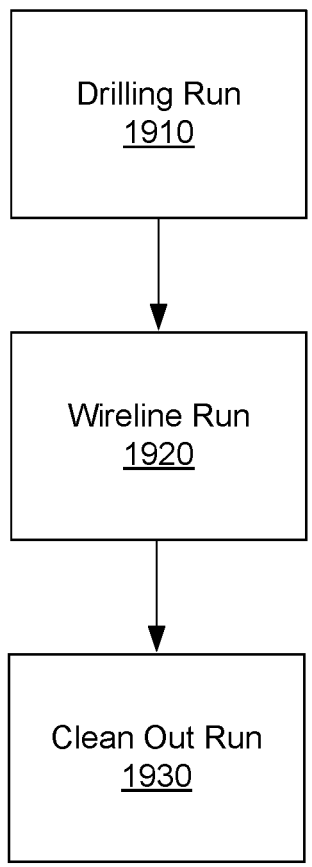
FIG. 19 illustrates an example of a method.

FIG. 19 shows an example of a method 1900 as associated with sub-activities in the context of well construction. As shown, the method 1900 can include a drilling run block 1910, a wireline run block 1920 and a clean out run block 1930. With respect to the method 1500 of FIG. 15, note that sub-activities may be generated via the planning block 1520, for example, one or more sub-activities may be dynamic in that operations are performed at a rigsite where data may be acquired during such activities, which may provide feedback, which can be utilized in a dynamic manner such that one or more aspects of the method 1900 may be updated in real-time. As an example, the method 1900 may be performed using information received from one or more entities where such information may be translatable into one or more goals, one or more constraints, etc.

Figure 20:
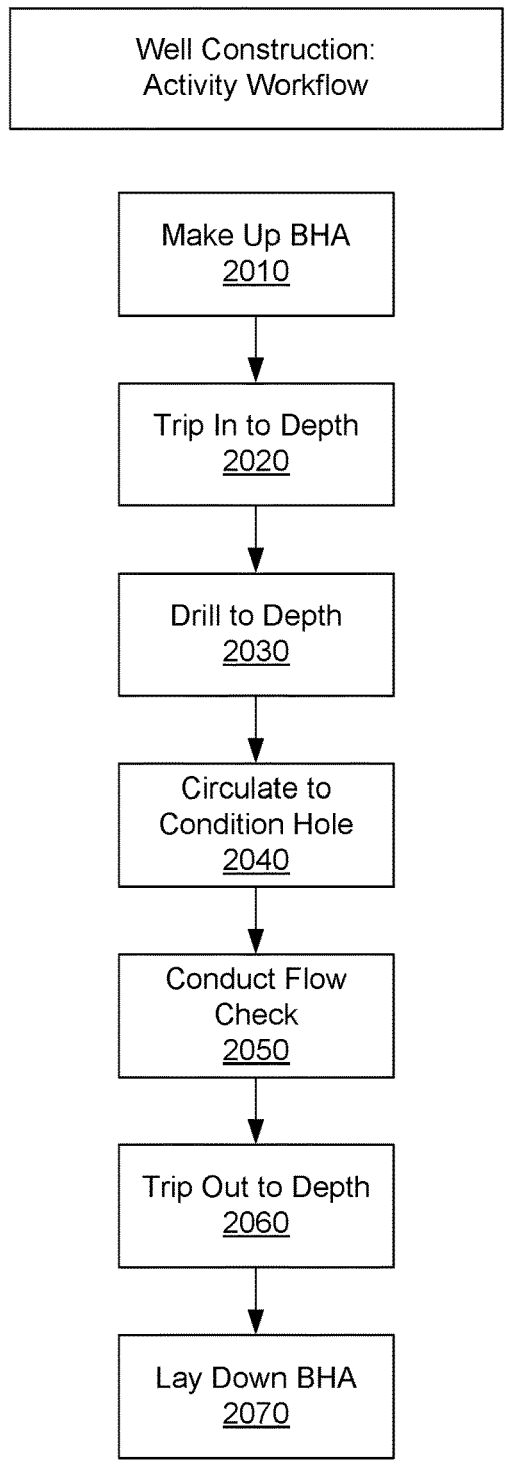
FIG. 20 illustrates an example of a method.

FIG. 20 shows an example of a method 2000 as associated with an activity workflow in the context of well construction. As shown, the method 2000 can include a make up BHA block 2010 for making up a bottom hole assembly (BHA) for drilling at least a portion of a well, a trip in to depth block 2020 for tripping the made up BHA to a depth, a drill to depth block 2030 for utilizing the BHA for drilling to a depth (e.g., as may be specified by a digital drill plan for a particular section of a well), a circulate to condition hole block 2040 for circulating material (e.g., fluid, etc.) to condition a bore hole, a conduct flow check block 2050 for conducting a flow check as to flow of fluid (e.g., liquid, gas, slurry, etc.) in at least a portion of a bore hole, a trip out to depth block 2060 for tripping out at least a portion of the BHA to a depth (e.g., surface, sea bottom, etc.), and a lay down BHA block 2070 for laying down a BHA (e.g., or portion thereof). As an example, the method 2000 may be performed using information received from one or more entities where such information may be translatable into one or more goals, one or more constraints, etc.

With respect to the example method 1500 of FIG. 15, the activity workflow block 1570 is illustrated to be an end block of the method 1500. As an example, such a block may be performed where planning of the planning block 1520 may actively plan one or more operations for the well and/or for one or more other wells, whether under construction or completed. For example, information acquired during the method 1500 may be utilized to plan and/or perform operations at one or more other sites, which may be rigsites, wellsites, etc. For example, consider replanning an existing digital drill plan for another well and/or planning a stimulation treatment for another well, which may be a production well that has already produced some amount of fluid from a reservoir, etc. Such a stimulation treatment may, for example, be based on knowledge acquired during a method such as the method 1500, where such a treatment can increase production (e.g., total production) from the well to be treated.

Figure 21:
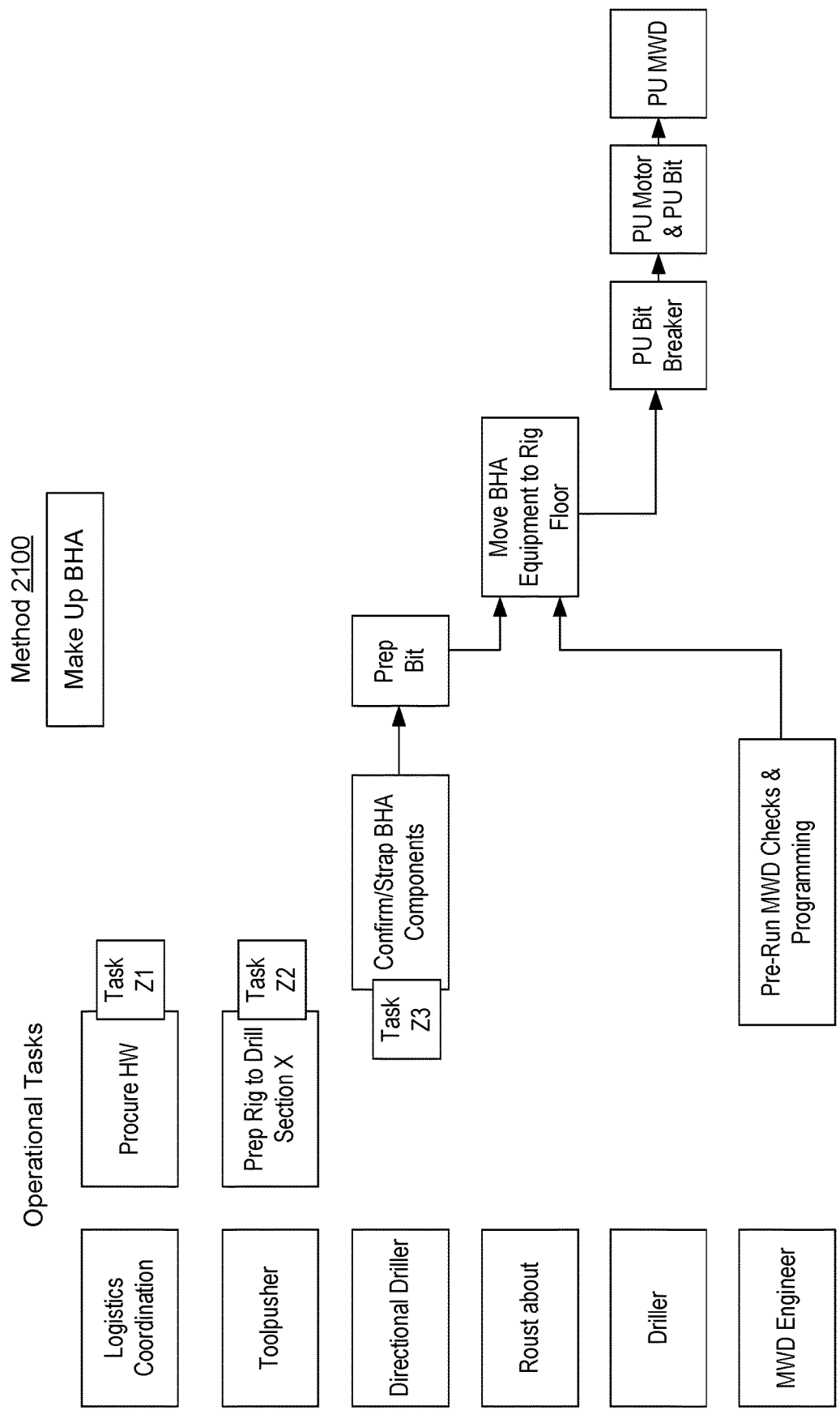
FIG. 21 illustrates an example of a method.

FIG. 21 shows an example of a method 2100 as various operational tasks that may be associated with the make up BHA block 2010 of the method 2000 of FIG. 20. As shown, the operational tasks can be specified in a logical manner where various tasks are assigned to particular resources (e.g., individuals, machines, teams, etc.). In the example of FIG. 21, the resources include a logistics coordination resource, a toolpusher resource, a directional driller resource, a roust about resource, a driller resource and a measurement while drilling (MWD) resource. As shown, various tasks can be depended on other tasks.

In the example of FIG. 21, tasks are shown as including procurement of hardware, preparation of a rig to drill a section (e.g., section X), confirmation and strapping of BHA components (e.g., to make up the BHA), preparation of a bit, pre-run MWD checks and programming, movement of the BHA equipment to rig floor, various driller tasks are then listed for performance once particular other tasks have been completed. As shown, where various pieces of equipment are available at the rig floor, tasks can include picking up a bit breaker, picking up a motor and bit, picking up a MWD tool, etc., which can be strung (assembled) as a BHA as part of a drillstring.

Figure 22:
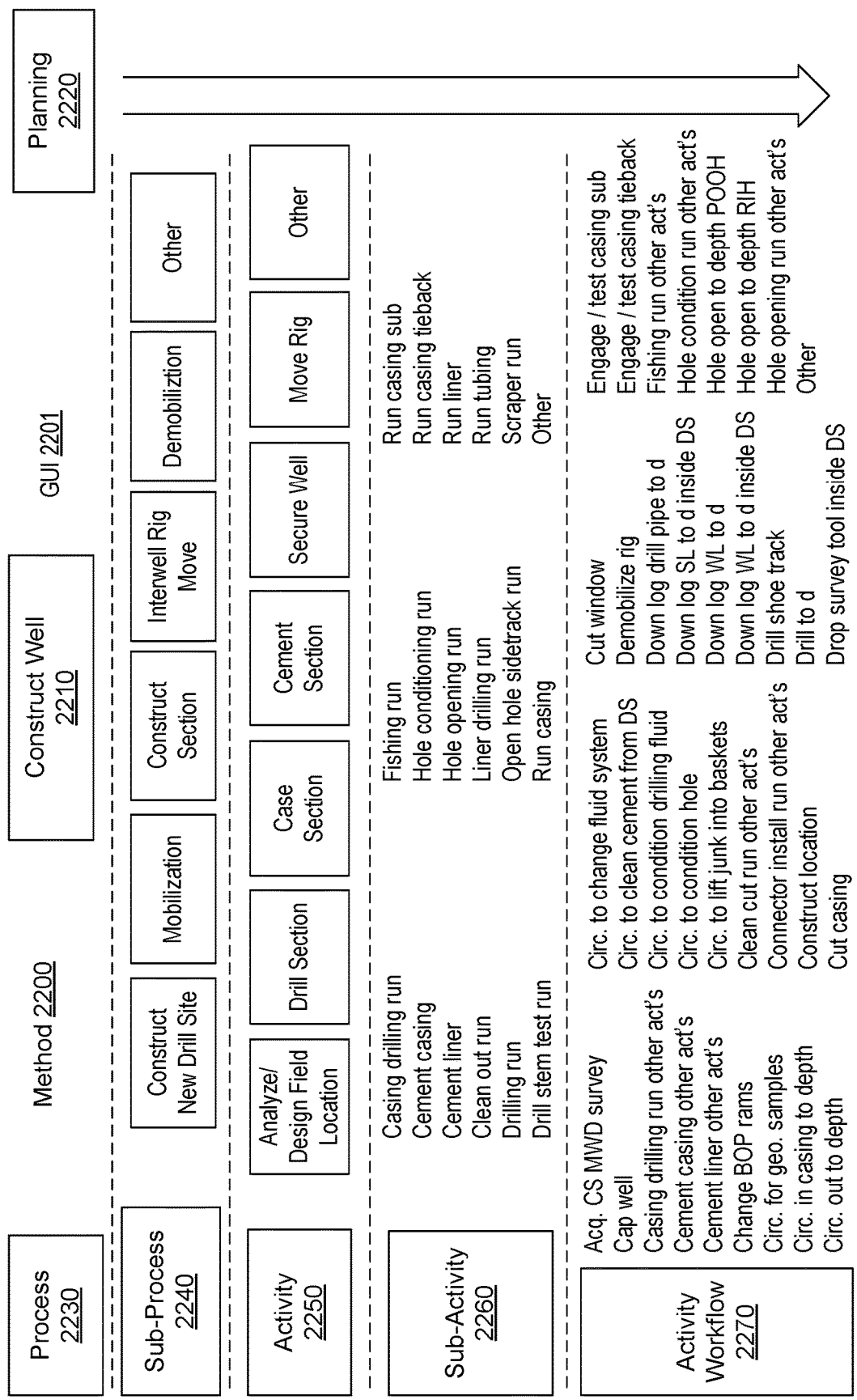
FIG. 22 illustrates an example of a method and an example of a graphical user interface.

As an example, FIG. 22 shows how well construction may be cast in terms of one or more tiers or levels. For example, a structural representation of well construction can include processes, sub-processes, activities/sub-activities, and activity workflows/sub-activity workflows. Such a logical structure can be utilized in real-time in a prescriptive and/or dynamic manner. Such a logical structure can be utilized and/or modified in a data-driven manner where data may be utilized directly and/or via one or more models. In such an example, events may be output to an inference engine that can output feedback to inform one or more features of a system that act to determine how well construction is structured and how operations are executed. In such an example, an overall dynamic approach can provide for enhanced operations at one or more sites for constructing one or more wells where, for example, one or more of such wells may be under construction. As mentioned, output from a dynamic system may inform one or more operations as to one or more producing wells, for example, as to operational parameters, stimulation treatment, etc.

FIG. 22 specifically shows an example of a method 2200 and an example of a graphical user interface (GUI) 2201 that can be an interactive interface that renders information as to the method 2200 and/or a system such as the system 1000 of FIG. 10.

As shown in FIG. 22, the method 2200 includes a context block 2210 that provides the context of constructing a well while a parallel process or processes occur via a planning block 2220, which provides on-going planning (e.g., and/or replanning) during a well construction process per the context block 2210.

As shown, the method 2200 includes a process block 2230, a sub-process block 2240, an activity block 2250, a sub-activity block 2260, and an activity workflow block 2270. Such blocks can be associated with various blocks of the system 1200, which, as mentioned, can provide for real-time operations associated with a rigsite, which can include drilling operations.

In the example of FIG. 22, there is a single process, 5 example sub-processes, 6 example activities, 17 example sub-activities and over 30 example items as to an activity workflow where various activities are for fluids. As shown, a tiered or leveled approach can provide a hierarchy that is logical as well as prescriptive and dynamic.

Figure 23:
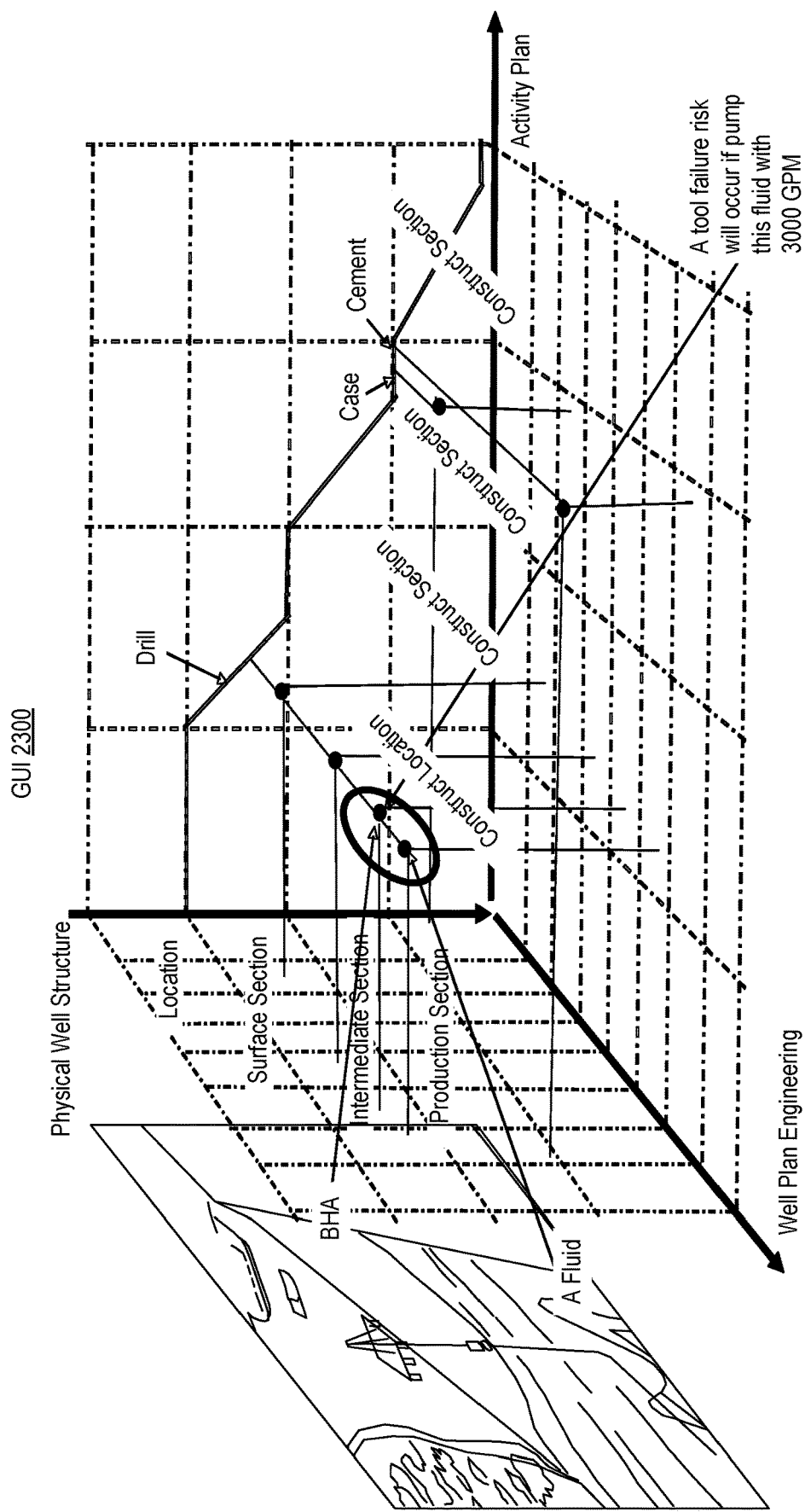
FIG. 23 illustrates an example of a graphical user interface.

FIG. 23 shows an example of a graphical user interface 2300 that includes a multi-dimensional system, which may be referred to as an operational space or a field development space for visualizing various operations that may be part of a well plan. For example, the GUI 2300 includes: a physical well structure dimension with location, surface section, intermediate section and production section labels that demarcate physical structures of a well that may be drilled into a geologic environment; a well plan engineering dimension that includes development activities such as, for example, one or more of rig selection, trajectory design, casing design, bit design, drilling fluids design, cementing design, and logging design, which may be organized along the well plan engineering dimension in an order that can correspond to an approximate order based on dependencies (e.g., a BHA design being dependent on a bit design, a trajectory design, etc.); an activity plan dimension that can correspond to a linear progression in time as to field development operations; and one or more scenario dimensions that can highlight one or more regions within the foregoing three dimensions where one or more development operations can benefit from one or more adjustments. As an example, a scenario dimension may be a risk dimension that highlights a risk in a multidimensional space.

As shown in FIG. 23, a risk dimension indicates that a risk of a tool failure exists if pumping of a particular fluid occurs at a rate of 3,000 gallons per minute (GPM). The risk dimension is shown as a cloud or multidimensional indicator (e.g., circle, polygon, polyhedron, sphere, ellipsoid, etc.) about a region where such a risk exists. Within the highlighted region, a BHA specification exists along with a fluid as represented by markers. The markers are indicated as being at a particular position along the physical well structure dimension, the well plan engineering dimension and activity plan dimension. As indicated, the highlighted risk exists along a drilling activity within the surface section of the physical well structure.

FIG. 23 also shows a graphical representation of a portion of a geological environment into which the physical well is being drilled or to be drilled. The graphical representation can be a graphical user interface and/or part of the GUI 2200. The graphical representation, as a GUI, can include control graphics that can be selected (e.g., actuated), which may, for example, cause rendering of one or more other GUIs to a display. For example, along a right side column, icons are shown that can correspond to framework tools that can be instantiated and utilized. Such tools may be highlighted to correspond to one or more features highlighted in the multidimensional system. For example, where a risk exists with respect to a BHA, a BHA control graphic may be highlighted that upon actuation switches a user to a BHA GUI that can adjust one or more parameters associated with a BHA (see, e.g., the drillstring 560 of the GUI 500 of FIG. 5).

In FIG. 23, the GUI 2300 shows in a plane, defined by the physical well structure dimension and the activity plan dimension, a series of lines that represent operations with respect to depth or length along a well trajectory. In a glance, a user or users may understand how a well is to be drilled as part of a plan to develop a field. During drilling, a marker may be rendered in the plane based on information received from the field to show where a bit may be during drilling, etc.

Figure 24:
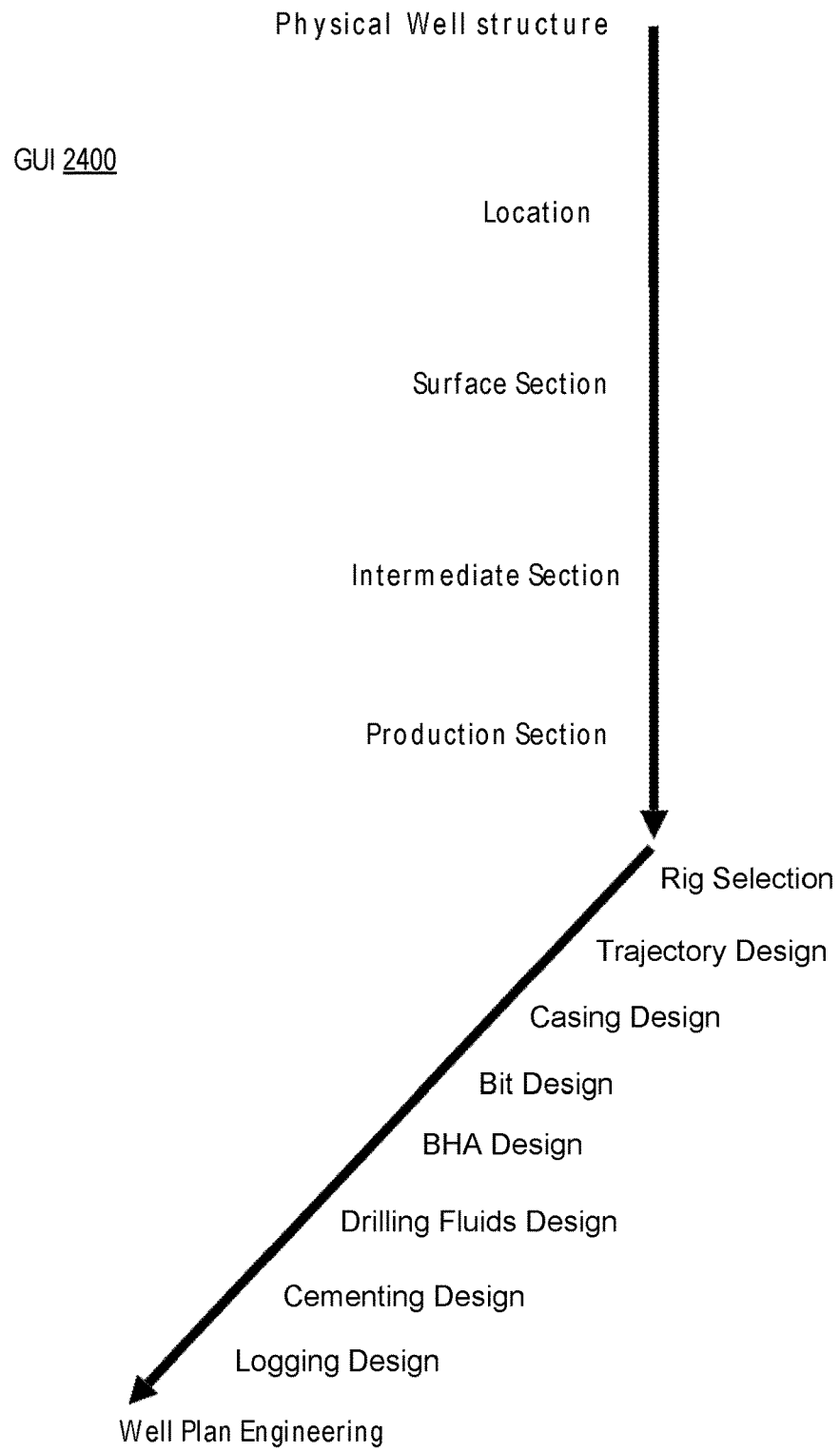
FIG. 24 illustrates an example of a graphical user interface.

FIG. 24 shows an example of a graphical user interface 2400 that includes the well plan engineering dimension along with some examples such as rig selection, trajectory design, casing design, bit design, drilling fluids design, cementing design, and logging design. Such designs can be present for one or more positions along the physical well structure dimension. As an example, "bit design" may be present along the subsurface sections of the physical well structure dimension and may change depending on section (e.g., where tripping out and tripping in may be performed as part of a bit change according to a bit design).

Figure 25:
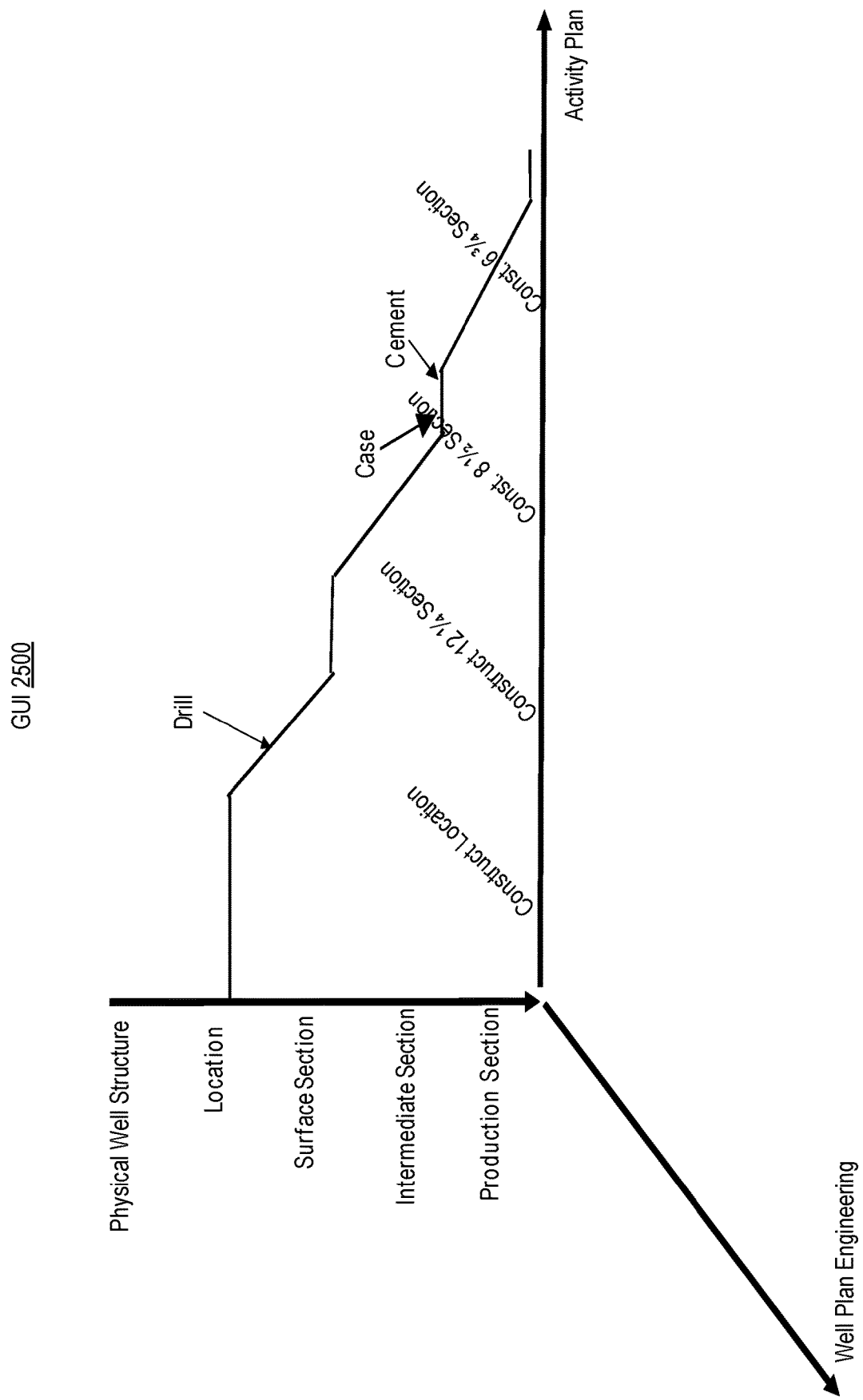
FIG. 25 illustrates an example of a graphical user interface.

FIG. 25 shows an example of a graphical user interface 2500 that includes the activity plan dimension along with some examples of markers for location and sections: construct location, construct 12¼ inch section, construct 8½ inch section, and construct 6¾ inch section. Such sections can correspond to sections of the physical well structure; noting that the activity plan dimension can be a time dimension, which may be linear, non-linear, continuous, non-continuous, continuous and non-continuous, etc.

Figure 26:
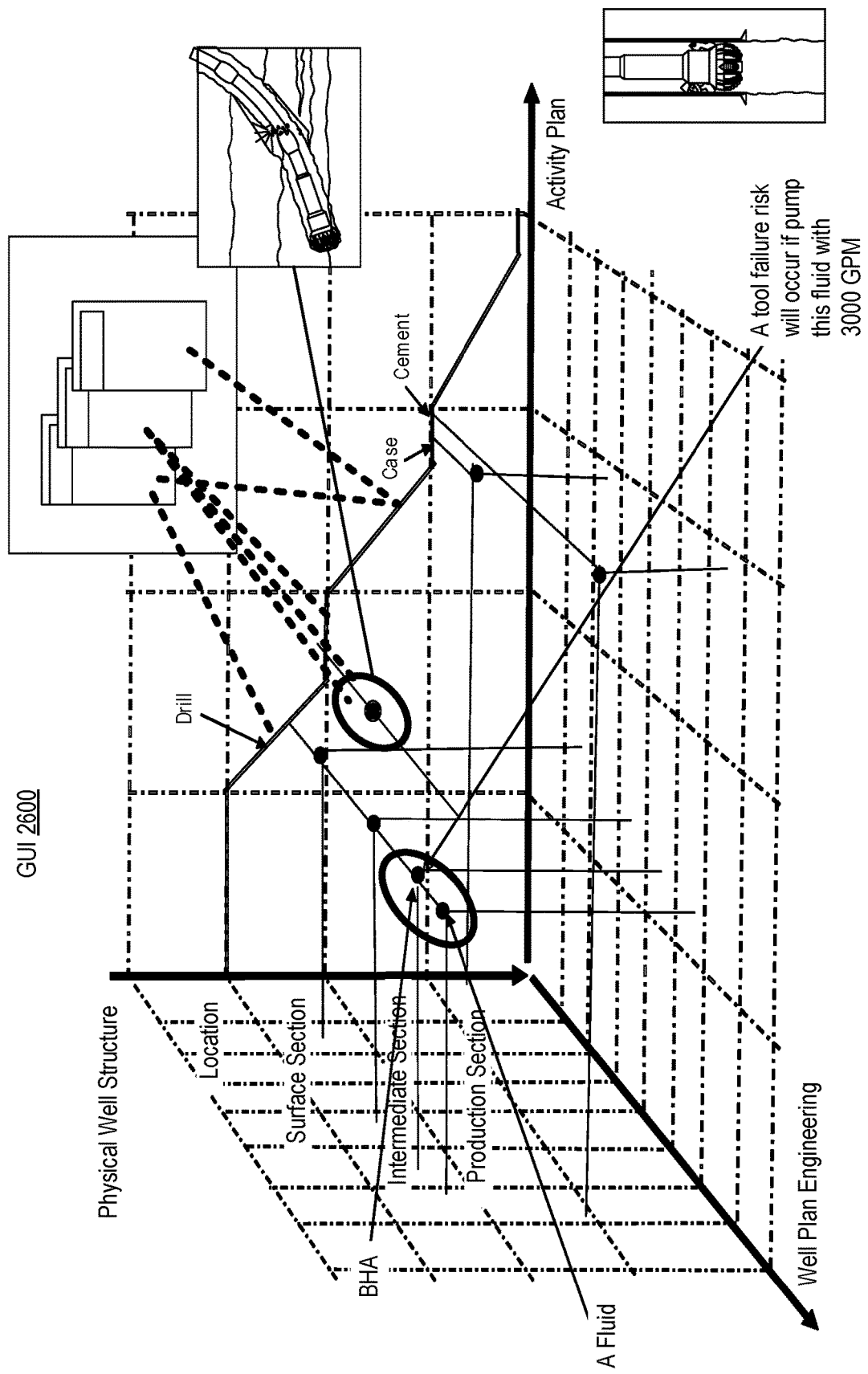
FIG. 26 illustrates an example of a graphical user interface.

FIG. 26 shows an example of a graphical user interface 2600 as including graphical controls associated with digital documents (e.g., digital files). For example, an operations procedure document (OP), a checklist document, a work instructions document (WI), or other document may be linked with one or more points within the multidimensional system. The example of FIG. 26 includes two highlighted scenarios that can correspond to risk or level of risk for one or more activities along the activity plan dimension. As an example, a highlighted region can correspond to a single point in the physical well structure dimension and the plan activity dimension plane or a highlighted region can correspond to multiple points in the physical well structure dimension and the plan activity dimension plane. As an example, a user may navigate a cursor to a highlighted region (e.g., or touch a highlighted region on a touchscreen) to activate a menu that can list menu options that are associated with conditions, specifications, etc., that underlie a reason as to why the region was highlighted (e.g., increased level of risk, conflicting parameters in design, etc.).

FIG. 26 also shows an example graphic of a bore drilling issue that can be due to bore geometry (e.g., well trajectory geometry) and another graphic of a bore drilling issue that can be due to an accumulation of debris ("junk") in the bore, which may interfere with drilling operations. As indicated in FIG. 26, the notification as to the issue is associated with a position in the multi-dimensional space defined by dimensions for physical well structure, well plan engineering and activity plan. The issue is shown as being associated with a particular BHA and a fluid. As an example, a method can include rendering an issue in a multi-dimensional environment where the rendering can occur prior to performing one or more activities along the activity plan dimension.

FIG. 27 shows an example of a graphical user interface 2700 that illustrates a workflow that can fuse various types of policies, standards, procedures, and guidelines. For example, various entities can specify logic that can include technical logic for performing one or more field operations. Such logic can be particular to an entity, for example, based on expertise, risk, etc., of the entity and what that entity may be providing as a service, as a product, etc. For example, a particular downhole tool may be supplied by an entity to perform a field operation where the entity has expertise as to how the downhole tool is to be utilized, under what conditions it is to be utilized, etc. As illustrated in the GUI 2700, a workflow can fuse logic from a plurality of different entities such that a tiered output can be generated, which is shown as including a plurality of levels: L2 to L7. Further, the GUI 2700 provides guidance as to levels and sequences of activities that describe well construction and tasks and operational steps, which can include work instructions, checklists, etc. The tiered output can be utilized to construct a well and may include executable commands, instructions, etc., that may be consumed by one or more pieces of equipment, which may, in response to receipt thereof, perform one or more actions, be configured for performance of one or more actions, etc. For example, consider a programmable downhole tool being programmed per a work instruction associated with the level L6 Tasks. As an example, a programmable downhole tool may be programmed to acquire sensor data at an instructed resolution, frequency, acquisition algorithm, etc.

The approach of FIG. 27 can allow for rendering a work breakdown structure (WBS) that provides an ability to trace goals and constraints associated with well construction from a high level (e.g., strategic level) down to a lower level (e.g., tactical level). For example, components of the GUI 2700 can allow for tying back the "why" something is being done to a source reference (e.g., one of the entities). While the GUI 2700 shows various arrows from left to right, an approach may operate from right to left. For example, consider selection of the work instructions, rendering of a drop-down list of itemized work instructions, selection of one of the itemized work instructions of the list, and highlighting at least one of the entities as being a source of the selected one of the itemized work instructions of the list. In such an example, the client operator entity may be highlighted where a procedure layer is specifically highlighted, which may be selected to render information from that procedure layer that gave rise to the selected one of the itemized work instructions of the list. If a user perceives a conflict, a lack of clarity, etc., the user may query the client operator as to the particular procedure. As an example, where the procedure is then revised (e.g., updated), the fusion process may be performed to regenerate one or more of the levels, for example, to revise one or more of the tasks of L6 such that revised work instructions are output.

The example workflow of the GUI 2700 of FIG. 27 may be utilized at one or more times such as during one or more phases. For example, consider a phase that involves selection of a third party where various third party entities are plugged in to see results of fusion. Such results may be analyzed to determine an optimal third party (e.g., an equipment supplier, a service provider, etc.). As another example, consider a construction phase where a revision to a plan may be desirable such as a revision to a policy and where the fusion process can be performed to update the tiered levels that provide the sequence of activities. Yet another example can be a forensic analysis where the workflow is utilized to determine whether actual activities performed during construction followed one or more policies, standards, procedures, guidelines, etc., of one or more entities. In such an example, a database of tiered actual data may be compared to the tiered output and where a discrepancy exists, the workflow of the GUI 2700 may proceed from right to left to highlight entity information that can be examined to determine whether or not a variance in tiered actual data complied or did not comply with one or more policies, standards, procedures, guidelines, etc. For example, during actual operations to construct a well, an operator may be aware of the scope of a procedure such that some variance is possible, which may not be present in the logic used for fusion. In such an example, the logic may optionally be revised to account for such a variance.

As an example, a workflow such as the workflow of the GUI 2700 of FIG. 27 may be utilized to confirm that a well was constructed per the specifications provided by one or more entities. As an example, a computational framework can include an interface that receives data that specifies logic for policies, standards, procedures, guidelines, etc., and a component that fuses logic to generate output. Such a computational framework can include an interface that receives data that are associated with actual field operations and that compares that data to generated output where, in response to one or more comparisons, a component identifies one or more policies, standards, procedures, guidelines, etc., which may be associated with one or more entities. As an example, a computational framework can provide a logical, traceable structure for one or more purposes of planning, assessing, revising, etc., operations associated with construction of a well or wells.

As an example, a workflow can include logic associated at the well level and then cascaded down within a system. For example, consider the following tiered logical approaches:

---

A. Well cost
   1. Section cost
      a. Run cost / foot, etc.
A. No well control events during well construction
   1. Maintain two barriers
      a. Maintain a kick tolerance of
         X bbls in this section
      b. Obtain a Leak off Test of XX.XX
         ppg in this hole section
            i. Flow check each 500 ft interval

---

The foregoing examples may be expressed using a checklist or checklists. For example, a graphical user interface can translate such tiered logic into checklist graphical controls where "checks" are entered automatically, manually, etc. For example, consider equipment that transmits a signal after performing an operation such as a data acquisition operation for a flow check, which can include depth information (e.g., measured depth). In such an example, where flow checking is performed at each 500 feet, a signal may be transmitted to a computational framework that "checks off" an item or items on a checklist as rendered to a graphical user interface. In such an approach, a user may visualize one or more processes as it or they are performed. Where the user receives an indication that a process has been performed, the user may, as appropriate, manually enter a check (e.g., a "check off"). If a check is missing or delayed, the computational framework may issue a notification, which may cause a user to assess operations to determine why a particular item on the checklist has not been "checked off".

FIGS. 28, 29, 30 and 31 show examples of graphical user interfaces 2800, 2900, 3000, and 3100 that include information as to logic of policies, standards, goals and constraints. One or more of the GUIs 2800, 2900, 3000 and 3100 may be part of a workflow or workflows of a computational framework such as one associated with the GUI 2700 of FIG. 27. For example, the policy and/or standard information may represent types of information that can be received by an interface of a computational framework, which may generate logic based thereon to fuse such information into output for construction of a well.

As shown in the GUI 2800 of FIG. 28, the information can provide for numeric data that can be compared to actual data for constructing a well. In such an example, comparisons may be made, which may be utilized for performing "check offs" on a checklist, determining whether one or more policies, etc., have been followed, etc., issuing one or more notifications, etc. The GUI 2800 shows some examples of goals to be achieved such as "no loss of well control" and "maintain structural integrity of well". As shown, various types of data can be indicative of such goals where such data can be sensor data and/or determined using sensor data.

In the example GUI 2900 of FIG. 29, a goal is to have no HSE events such that a policy is met that minimizes risk to humans operating technology/equipment provided for a well construction process. As to the examples of constraints, one or more of these may be expressed in a logical manner, optionally via a checklist where the checklist may be part of a larger logical structure (e.g., a larger checklist) where various operations are not to proceed until various items are "checked off". Where information, actions, etc., occur prior to a particular constraint being met, a computational framework may issue a notification and may optionally lock out a system in a manner that is to be cleared or overridden to proceed. Such an approach may provide for additional assurances as to the goal to be achieved (e.g., minimize risk to humans, etc.).

In the example GUI 3000 of FIG. 30, various goals are presented as associated with a policy and/or a standard to identify the most cost effective method to extract hydrocarbons from a reservoir with consideration for the life cycle of a well. As shown, one of the goals is to place the well at the desired position within the reservoir. Such a goal can be a location phase as may be associated with planning and generating a well trajectory. Meeting that goal may generate information for a multi-dimensional plot as shown in the GUI 2600 of FIG. 26 (see, e.g., location and sections).

In the example GUI 3100 of FIG. 31, various goals are presented as associated with one or more policies to conform to country, state and/or government regulations, which pertain to actions that would contradict regulations and providing information as demanded by regulatory authorities in a timely manner. As shown under constraints, numeric data may be acquired and provided where a comparison may be made during one or more phases to determine whether operations conform to one or more of the one or more policies. As an example, one or more of the constraints may be translated into one or more automated controls. For example, consider a controller that is programmed using a constraint to acquire test data as to well control equipment at intervals of XX days (or less). In such an example, conformance with the policy can be achieved using at least some degree of automation. As shown in the example GUI 3100, relief well information may be germane to policy compliance, which may include generating tiered levels for construction of a relief well. As an example, a multi-dimensional space can include activities of an activity plan for constructing a relief well that is triggered based on operations performed for construction of a main well, which may be a policy-based trigger. For example, consider conditions associated with construction of the main well that indicate, according to a policy, that a relief well is to be built. Such conditions, as indicated by actual field data acquired during construction of the main well, may trigger revision of a plan to include activities to build the relief well, which may have its own associated policies, standards, procedures, guidelines, etc. In such an example, a workflow as in the GUI 2700 may be executed that performs fusion for generation of tiers that express at least a sequence of activities that describe construction of a relief well.

FIG. 32 shows an example of a graphical user interface 3200 that includes various types of information for construction of a well where times are rendered for corresponding actions. In the example of FIG. 32, the information may be part of a work breakdown structure (WBS); noting that the information of the GUI 1690 of FIG. 16 may be part of a WBS.

In the example of FIG. 32, the times are shown as a clean time (CT) in hours, an estimated time (ET) in hours and a total or cumulative time (TT), which is in days. The clean time may be for performing an action or actions without occurrence of non-productive time (NPT) while the estimated time can include NPT, which may be determined using one or more databases, probabilistic analysis, etc. In the example of FIG. 32, the total time (or cumulative time) may be a sum of the estimated time column. As an example, during execution and/or replanning the GUI 3200 may be rendered and revised accordingly to reflect changes. As an example, the GUI 3200 may be rendered to a display with a GUI such as the GUI 1690 of FIG. 16 or, for example, one of the GUIs may be accessible via another one of the GUIs. As shown in the example of FIG. 32, the GUI 3200 can include selectable elements and/or highlightable elements. As an example, an element may be highlighted responsive to a signal that indicates that an activity is currently being performed, is staged, is to be revised, etc. For example, a color coding scheme may be utilized to convey information to a user via the GUI 3200.

Figure 33:
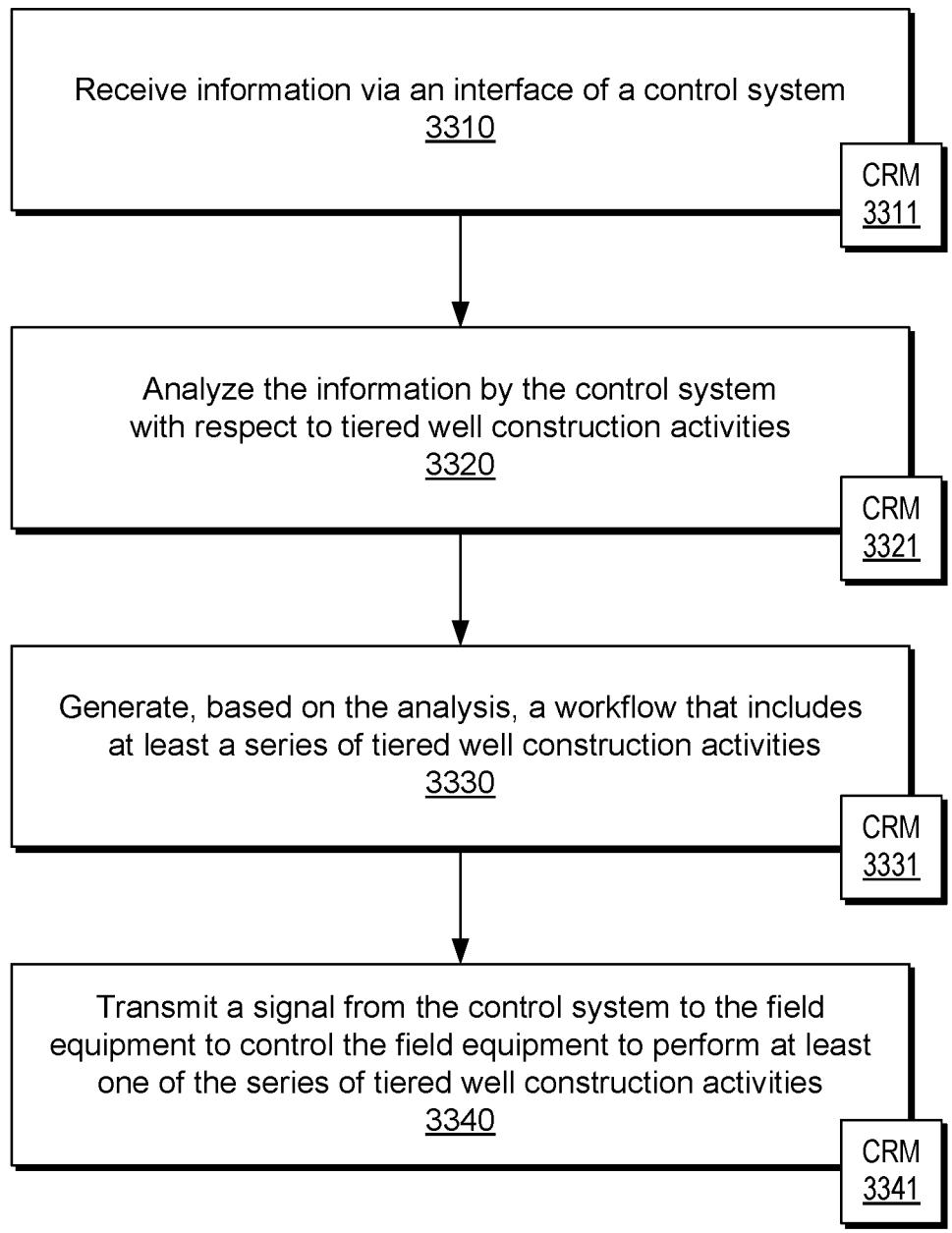
FIG. 33 illustrates an example of a method.

FIG. 33 shows an example of a method 3300 for controlling field equipment where the method 3300 includes a reception block 3310 for receiving information via an interface of a control system; an analysis block 3320 for analyzing the information by the control system with respect to tiered well construction activities; a generation block 3330 for, based on the analyzing, generating a workflow that includes at least a series of tiered well construction activities; and a transmission block 3340 for transmitting a signal from the control system to the field equipment to control the field equipment to perform at least one of the series of tiered well construction activities. As mentioned, a method can include utilizing constraints for generating a workflow that includes at least a series of tiered well construction activities. As an example, a method can be dynamic and generate a workflow responsive to a change in circumstances, for example, a change with respect to circumstances considered during planning. As an example, a method may generate a revised workflow.

The method 3300 of FIG. 33 is shown as including various computer-readable storage medium (CRM) blocks 3311, 3321, 3331, and 3341 that can include processor-executable instructions that can instruct a computing system, which can be a control system, to perform one or more of the actions described with respect to the method 3300. As an example, a system such as the system 790 of FIG. 7 may be utilized to implement one or more portions of the method 3300. As an example, the instructions 796 may include instructions executable by at least one of the one or more processors 793 (see, e.g., the blocks 3311, 3321, 3331 and 3341).

As an example, a method can generate a work breakdown structure (WBS), which may represent a workflow. Such an approach can allow for linking data, instructions, information, etc., to the WBS, which can facilitate control, rendering, reporting, revisions, etc.

As an example, a WBS can provide for linking to operations to perform under certain conditions in the well. For example, a WBS can be "live" and provide for real-time reporting, particularly as to constraints, which may be associated with reporting demands, compliance, etc.

As an example, a WBS can provide for assessing what had been planned in comparison to actual execution, which may be utilized to plan a subsequent well and/or revise construction of a well that is under construction.

As an example, a PDDL approach may utilized planned versus actual information to improve planning over time. As an example, a WBS can be used to describe a plan where it can be dynamically updated during execution such that an original plan and one or more revised plans result. In such an example, the revised plans can be part of a "live" plan at various points in time that has evolved dynamically during life of well construction. Such a live plan can be associated with various types of actual data as to conditions, etc., that occurred during well construction. As an example, a live plan can be associated with data concerning equipment, servicing of equipment, weather, people, etc.

With a dynamic planning approach, deltas may be discerned with respect to time during well construction, which can allow for a comparison of cumulative deltas to understand better how one delta may have given rise to another delta or, for example, where deltas are independent.

As mentioned, a data structure can be linked to instructions such as software instruction (SWIs) that may be for issuing notifications, rendering information, controlling a piece of equipment associated with movement of downhole equipment, etc. As mentioned, a controller or controllers may provide for control of a rotary table, a top drive, a drilling fluid pump, a drawworks, etc., can be controlled, for example, to drill a borehole (e.g., deepen a borehole).

As an example, a WBS can be linked to resources that may be for performing one or more activities. For example, consider a WBS that includes digital commands that can be issued to provision one or more resources. As an example, a resource may be a material resource, an equipment resource, a human resource, a computational resource (e.g., cloud-based resource, etc.), etc. As an example, a WBS may be part of a system that includes one or more interfaces that can receive information pertaining to resources. For example, where provisioning is for a downhole tool for performing an activity and the downhole tool is not available at a particular time according to a plan specified by the WBS, the system may issue a notification and/or issue a signal that aims to provision the resource from a different source or to provision a fungible resource, which may result in a change to one or more constraints, introduction of a new constraint, etc.

As an example, a WBS can provide for relational linking of one or more types of information, which may be instructions that are executable by a machine. As an example, a relational link may be to an object as in object-oriented programming. As an example, a hierarchical architecture may be provided for attaching information to a WBS, which may occur via manual interaction and/or automatically. For example, consider a WBS that specifies a particular activity where that activity is used to search a database of work instructions, which may be machine executable, to link such work instructions to the WBS. In such an example, an assessment may occur to determine whether one or more constraints are to be revised, one or more new constraints added, etc. For example, consider a manufacturers update to instructions for operation of a tool where the instructions can be assessed to formulate a constraint that may cause some amount of replanning and revision to the WBS. As an example, a WBS can be extensible in that one or more types of information may be linked (e.g., associated, attached, etc.), which may cause one or more dynamic actions such as revision to the WBS.

As an example, where drilling is performed in part via textual instructions for humans, such information may be linked to a WBS. In such an example, a human may review the WBS (e.g., via one or more GUIs, etc.) to gain insight into the text, how the text was interpreted, what actions were taken by a human or humans, etc. As an example, a method can include analyzing text and/or human notes to plan, replan, etc. For example, consider a PDDL type of approach that can utilize such text, human notes, etc.

As an example, where a service provider entity is performing an activity and an instruction is received from a customer that may be a change order or other update, a WBS may be utilized for assessing the change or update and, if appropriate, replanning, with estimates of individual times, resources, outcomes, total time, etc. As an example, a change or update may be assessed in a manner described with respect to the GUI 2700 of FIG. 27 where a check can be performed to determine whether or not compliance may be an issue with respect to one or more entities.

As an example, a WBS can provide for a section-by-section comparison of different sections of a well. For example, consider a comparison of a number of bit runs, a number of tasks to construct a section, etc.

As mentioned, a WBS can depend on constraints, which can include one or more of time based, process based (e.g., do it in this order, etc.), formation based (e.g., per an earth model, etc.), equipment based (e.g., operating specifications, etc.), etc.

As an example, constraints can be attached to a WBS and can be used to define a WBS. As mentioned, a WBS can be dynamic in that it can be revised in response to one or more changes in constraints. As mentioned, a fusion process can be a logical process that aims to fuse information that explicitly and/or implicitly provides constraints.

As an example, at a borehole level, a WBS may be analyzed for a borehole section level such as number of days to construct and in how many bit runs. Such a WBS may then be analyzed for a bit run level, for example, to assess amount of time per bit run.

As an example, a WBS can allow for breaking down goals and constraints and where they can be logically attached to various events taking place. As an example, a WBS can provide for "what if" scenario analyses. For example, consider an analysis as to a change in procedure (e.g., as may be associated with a client or other entity). As an example, a WBS may be extensible in that a variety of types of information may be logically linked to the WBS where such information may optionally be assessed to determine whether the WBS is to be revised. Such an approach can allow detail to be controlled on a case-by-case basis. For example, a basic WBS may be utilized free from attachments or a WBS may be heavily attached to various types and amounts of information. As mentioned, in some instances, attached information may be of a type that can be recognized by a planning framework where such information may be assessed to determine whether or not it has an impact on planning (e.g., generation of a WBS, etc.).

As explained with respect to the GUI 2700 of FIG. 27, a system may provide for forensics, for example, to trace back to determine what happened when to facilitate a determination as to why. As an example, a WBS can be a structure that is storable and assessable by a computational framework. For example, consider assessing whether one or more standard operating procedures (SOPs) were followed and, if not, when an actual operating procedure deviated from an SOP. In such an example, a constraint or constraints may be identified as being a reason for lack of compliance, for example, consider conflicting constraints, constraints that differ (e.g., time versus depth, etc.), etc.

As an example, for a reservoir section of a wellbore, an assessment may pertain to when the hydrocarbons are exposed, which may be a reportable event and an event that causes an overall assessment as to resources, timing, etc., to get to that event. In such an example, a WBS may be utilized to perform such an assessment, optionally with reporting of compliance.

As an example, a system can include generating a primary plan WBS, a preemptive plan WBS, and a contingency plan WBS, which may be based on primary risks. In such an approach, a system may be switch to one or more of the plans depending on circumstances. As an example, during execution of a primary plan WBS, one or more other types of plans may be revised (e.g., preemptive, contingency, etc.).

As an example, a system can provide for management of a set of constraints and dynamically change a series of well construction activities to honor the constraints, which may occur in a planning phase of the well and/or in an execution phase of a plan.

As an example, a sequence of activities may be automatically and/or dynamically generated. For example, consider an approach that provides information regarding a desired trajectory in a subsurface region where the information is accessed and utilized to automatically generate a digital well plan (e.g., a WBS, etc.). As an example, depending on circumstances, a revised digital well plan may be dynamically generated.

As an example, a digital well plan can be utilized for controlling equipment or advising a human (e.g., via a GUI, etc.).

As an example, a method can include attaching a prescribed process to a level of an activity structure that influences the equipment control. For example, consider a prescribed process from a tool manufacturer that can be attached to a WBS where the prescribed process may include executable instructions that are executable by a processor of the tool to perform one or more actions.

As an example, a method can include attaching constraints to a level of an activity structure. For example, consider a GUI such as the GUI 1690 of FIG. 16 or the GUI 3200 of FIG. 32 where a user may click on an activity and attach a constraint. For example, consider a right-click that causes rendering of a menu with options to add one or more types of constraints. In such an example, a replan trigger may be issued where the type of constraint is of a type that can affect planning (e.g., or execution of a plan).

As an example, a WBS can be a type of data structure that is defined to accommodate planning and field operations. As an example, such a structure may be generated by a system starting with plan goals or starting with field operations. For example, such a structure may be relatively consistent looking forward or looking backward. As mentioned with respect to the GUI 2700 of FIG. 27, a system can provide for tracing backwards and/or forwards, for example, to associate activities with policies, standards, procedures, guidelines and/or one or more other sources of information, which may optionally be fused to logically generate a data structure that represents a series of tiered well construction activities. As an example, a structure may be statically generated or dynamically generated in a planning platform based on a combination of defined constraints and well design choices.

As an example, information to dynamically generate a WBS may be packaged into a machine readable digital format that can be loaded into a wellsite operating system (see, e.g., the system 470 of FIG. 4).

As an example, tiered well construction activities may include activities that are tiered via static analysis and may include activities that are tiered via dynamic analysis. As an example, an activity may be specified to be fixed in one or more manners, for example, with respect to constraints such that the activity is not dynamically altered; whereas, another activity may be specified to be dynamic in one or more manners, for example, with respect to constraints such that the activity can be dynamically altered. For example, consider a safety meeting as being an activity that is fixed; whereas, a directional drilling activity that aims to reach a target can be an activity that includes some amount of dependency on circumstances such that it can be dynamically altered in one or more manners (e.g., rate of penetration, dogleg, length, etc., as long as the target is reasonable reached).

As an example, a method for controlling field equipment can include receiving information via an interface of a control system; analyzing the information by the control system with respect to tiered well construction activities; based on the analyzing, generating a workflow that includes at least a series of tiered well construction activities; and transmitting a signal from the control system to the field equipment to control the field equipment to perform at least one of the series of tiered well construction activities. In such an example, the at least one of the series of tiered well construction activities can include a drilling operation. As an example, a method can include analyzing that considered one or more constraints, which may be from one or more sources.

As an example, a method can include generating a workflow that includes at least a series of tiered well construction activities that generates the workflow according to constraints. In such an example, the constraints can include at least one time-based constraint, at least one depth-based constraint, at least one equipment operation-based constraint and at least one formation-based constraint. As an example, a constraint can be a fused constraint that is logically derived from at least two constraints.

As an example, a method can include, responsive to receiving information via an interface of a control system, formulating at least one constraint and, for example, generating a workflow that includes at least a series of tiered well construction activities according to the at least one constraint. For example, a constraint can be for an activity that is to be interspersed between other activities. As mentioned, a flow check constraint can be a constraint that demands stopping drilling, which can thereby affect a series of tiered well construction activities. As mentioned, such a constraint may be one or more of time-based, depth-based, etc. As an example, a constraint may be a logical formulation that operates dynamically responsive to circumstances.

As mentioned, a constraint may arise in a dynamic manner depending on circumstances. As mentioned, constraints may be fused such that multiple constraints can be formulated as a single constraint. For example, consider a flow check constraint that includes time and depth criteria that is formulated by a time-based constraint and a depth-based constraint. As an example, a fusion process may fuse constraints in a logical manner that can be utilized for purposes of control of one or more pieces of equipment, rendering of information to a display, etc., for example, to promote compliance with a policy, policies, a standard, standards, a procedure, procedures, a guideline, guidelines, etc.

As an example, a method can include, via a control system, provisioning field equipment. For example, such a method can include provisioning a plurality of pieces of the field equipment. In such an example, one or more protocols may be implemented to generate relationships between resources and equipment. Such relationships can include interfaces, data stores, entries in databases, security protocols (e.g., encryption, keys, etc.), etc. As an example, a piece of equipment may be associated with one or more resources in a cloud environment as part of a provisioning process. As an example, one or more instances of an object or objects may be instantiated in a cloud environment and/or a local environment as part of a provisioning process.

As an example, a method can include transmitting a control signal where such transmitting includes implementing an Advanced Message Queuing Protocol (AMQP).

As an example, a method can include receiving information where such information can be associated with an application programming interface (API) call and/or an API response. As an example, in a client-cloud or client-server architecture, a client machine can include local resources that can generate an API call to cloud resources or server resources. In such an example, the cloud resources or server resources can respond to the API call, optionally by processing information that may accompany the API call. As an example, such a call may include information germane to performance of one or more actions in a field (e.g., drilling a trajectory for a well, etc.). In such an example, the cloud resources or server resources can be part of a control system that can issue a control signal to one or more pieces of equipment to perform an action in a field. In such an example, a piece of equipment may be provisioned such that the control system has an established relationship with the piece of equipment for purposes of one or more of data acquisition, control, etc.

As an example, a method can include utilizing a control system that can control one or more pieces of equipment according to tiered well construction activities, which may include a process level, a sub-process level and an activity level. In such an example, the process level can include a well section construction process, the sub-process level can include a drill section sub-process and a case section sub-process and the activity level can include a drilling run activity and a run casing activity.

As an example, a control system can include a domain bounded assessor that includes trajectory information for a well where, for example, at least one of a series of tiered well construction activities constructs the well according to the trajectory information. In such an example, the control system can include receiving information that adjusts a trajectory specified by the trajectory information. In such an example, the information may be received by the control system via an API call. For example, a client machine can generate an API call that is transmitted via a network to the control system where the control system processes the API call for information, which may be utilized to effectuate control of a field action (e.g., directional drilling, etc.).

As an example, field equipment can include at least one sensor. In such an example, a control system can receive information that includes data acquired by at least one of the at least one sensor. For example, a control system can be implemented with one or more control loops that include one or more sensors. As an example, a control system may operate in part via information received via a client (e.g., an individual using a client machine) and in part via information received via a sensor (e.g., a piece of field equipment).

As an example, a series of tiered well construction activities can be associated with corresponding pieces of field equipment.

As an example, a series of tiered well construction activities can be associated with corresponding pieces of field equipment and corresponding resources at a rigsite. In such an example, a resource may be a human resource. As an example, a piece of field equipment may be a dedicated piece of field equipment that is to remain at a rigsite (e.g., or in a well, etc.) or may be a mobile piece of equipment that is amenable to use at a plurality of rigsites.

As an example, a workflow can include at least two well construction activities at a common tier. As an example, a workflow can include at least two well construction activities that are parallel activities. As an example, at least one of a series of well construction activities can include a movement activity for moving at least one piece of field equipment to a different site. For example, consider moving drilling equipment (e.g., a BHA, a rig, a portion of a rig, mud-pump equipment, etc.).

As an example, a system can include a processor; memory accessible by the processor; processor-executable instructions stored in the memory and executable to instruct the system to: receive information via an interface of a control system; perform an analysis of the information by the control system with respect to tiered well construction activities; based on the analysis, generate a workflow that includes at least a series of tiered well construction activities; and transmit a signal from the control system to the field equipment to control the field equipment to perform at least one of the series of tiered well construction activities.

As an example, one or more computer-readable storage media can include processor-executable instructions to instruct a computing system to: receive information via an interface of a control system; perform an analysis of the information by the control system with respect to tiered well construction activities; based on the analysis, generate a workflow that includes at least a series of tiered well construction activities; and transmit a signal from the control system to the field equipment to control the field equipment to perform at least one of the series of tiered well construction activities.

As an example, a method may be implemented in part using computer-readable media (CRM), for example, as a module, a block, etc. that include information such as instructions suitable for execution by one or more processors (or processor cores) to instruct a computing device or system to perform one or more actions. As an example, a single medium may be configured with instructions to allow for, at least in part, performance of various actions of a method. As an example, a computer-readable medium (CRM) may be a computer-readable storage medium (e.g., a non-transitory medium) that is not a carrier wave.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

Figure 34:
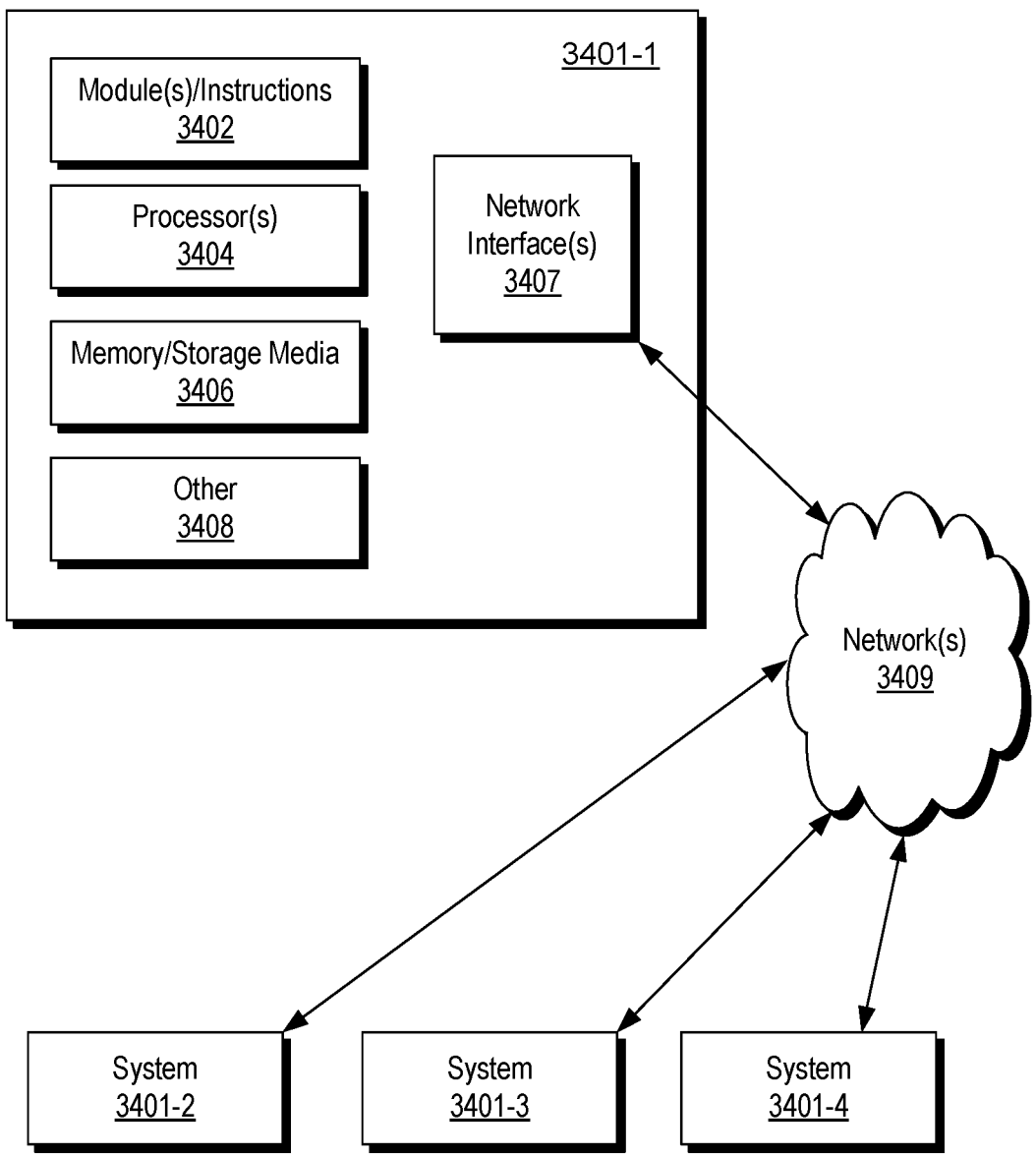
FIG. 34 illustrates an example of computing system.

In some embodiments, a method or methods may be executed by a computing system. FIG. 34 shows an example of a system 3400 that can include one or more computing systems 3401-1, 3401-2, 3401-3 and 3401-4, which may be operatively coupled via one or more networks 3409, which may include wired and/or wireless networks.

As an example, a system can include an individual computer system or an arrangement of distributed computer systems. In the example of FIG. 34, the computer system 3401-1 can include one or more modules 3402, which may be or include processor-executable instructions, for example, executable to perform various tasks (e.g., receiving information, requesting information, processing information, simulation, outputting information, etc.).

As an example, a module may be executed independently, or in coordination with, one or more processors 3404, which is (or are) operatively coupled to one or more storage media 3406 (e.g., via wire, wirelessly, etc.). As an example, one or more of the one or more processors 3404 can be operatively coupled to at least one of one or more network interface 3407. In such an example, the computer system 3401-1 can transmit and/or receive information, for example, via the one or more networks 3409 (e.g., consider one or more of the Internet, a private network, a cellular network, a satellite network, etc.).

As an example, the computer system 3401-1 may receive from and/or transmit information to one or more other devices, which may be or include, for example, one or more of the computer systems 3401-2, etc. A device may be located in a physical location that differs from that of the computer system 3401-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 3406 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 35:
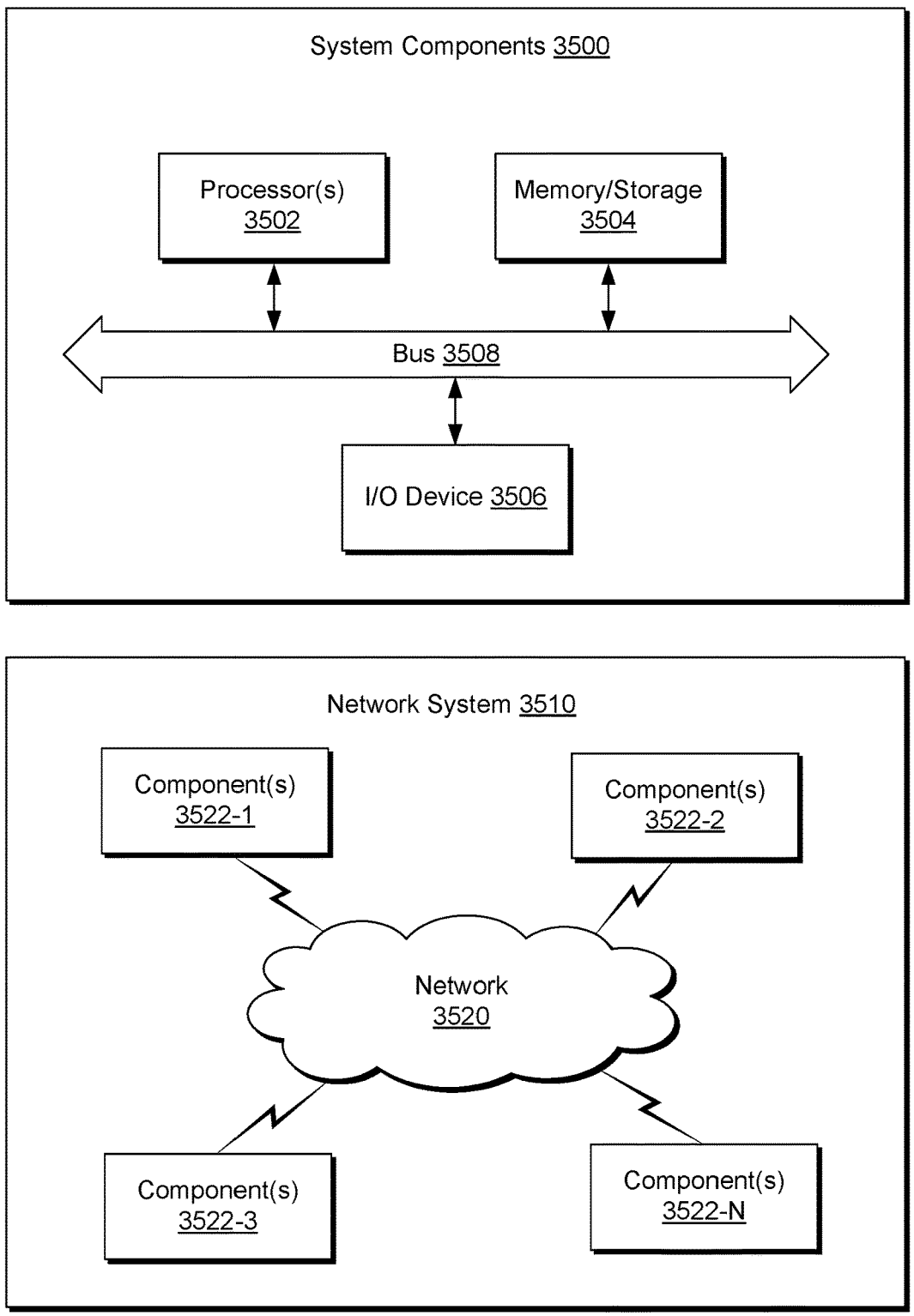
FIG. 35 illustrates example components of a system and a networked system.

FIG. 35 shows components of a computing system 3500 and a networked system 3510. The system 3500 includes one or more processors 3502, memory and/or storage components 3504, one or more input and/or output devices 3506 and a bus 3508. According to an embodiment, instructions may be stored in one or more computer-readable media (e.g., memory/storage components 3504). Such instructions may be read by one or more processors (e.g., the processor(s) 3502) via a communication bus (e.g., the bus 3508), which may be wired or wireless. The one or more processors may execute such instructions to implement (wholly or in part) one or more attributes (e.g., as part of a method). A user may view output from and interact with a process via an I/O device (e.g., the device 3506). According to an embodiment, a computer-readable medium may be a storage component such as a physical memory storage device, for example, a chip, a chip on a package, a memory card, etc.

According to an embodiment, components may be distributed, such as in the network system 3510. The network system 3510 includes components 3522-1, 3522-2, 3522-3, ... 3522-N. For example, the components 3522-1 may include the processor(s) 3502 while the component(s) 3522-3 may include memory accessible by the processor(s) 3502. Further, the component(s) 3522-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
    receiving information and analyzing the information with respect to tiered well construction activities;
    determining at least one constraint associated with the tiered well construction activities based on the information;
    generating a workflow, based on the at least one constraint, to be performed by field equipment, wherein the workflow includes at least a series of tiered well construction activities;
    generating a digital well plan for the workflow;
    executing the digital well plan by a control system to control the field equipment; and
    monitoring performance of at least one of the series of tiered well construction activities using one or more sensors to ensure that the at least one constraint is adhered to by control of the field equipment, wherein the at least one constraint includes a dynamic constraint that arises in response to the monitoring of the performance of the at least one of the series of tiered well construction activities, wherein the dynamic constraint is based on at least one change in circumstances.

2. The method of claim 1, wherein the at least one of the series of tiered well construction activities comprises a drilling operation.

3. The method of claim 1, wherein the at least one constraint includes at least one of: a time-based constraint, a depth-based constraint, an equipment operation-based constraint, and a formation-based constraint.

4. The method of claim 1, wherein the at least one constraint pertains to at least one goal, wherein the at least one goal is based on at least one of: policies, standards, procedures or guidelines.

5. The method of claim 1, further including dynamically changing the series of tiered well construction activities to adhere to the at least one constraint, wherein a revised digital plan that pertains to the dynamically changed series of tiered well construction activities is dynamically generated to be executed by the control system.

6. The method of claim 1, further including fusing the at least one constraint with additional constraints to control the field equipment to perform at least one of the series of tiered well construction activities based on the fused constraints.

7. The method of claim 1, wherein the at least one constraint includes an activity that is dynamically altered based on circumstances and is interspersed between other activities associated with a drilling operation.

8. The method of claim 1, wherein the monitoring comprises implementing one or more models for performance interpretation based at least in part on sensor data of the one or more sensors.

9. The method of claim 8, wherein the performance interpretation generates an event.

10. The method of claim 9, comprising, responsive to generation of the event, generating feedback using an inference engine.

11. The method of claim 10, comprising using the control system to control the field equipment according to the feedback and one or more constraints.

12. A system comprising:
a processor;
memory accessible by the processor;
processor-executable instructions stored in the memory and executable to instruct the system to:
receive information and analyzing the information with respect to tiered well construction activities;
determine at least one constraint associated with the tiered well construction activities based on the information;
generate a workflow, based on the at least one constraint, to be performed by field equipment, wherein the workflow includes at least a series of tiered well construction activities;
generate a digital well plan for the workflow;
execute the digital well plan to control the field equipment; and
monitor performance of at least one of the series of tiered well construction activities using one or more sensors to ensure that the at least one constraint is adhered to by control of the field equipment, wherein the at least one constraint includes a dynamic constraint that arises in response to monitoring of the performance of the at least one of the series of tiered well construction activities, wherein the dynamic constraint is based on at least one change in circumstances.

13. The system of claim 12, wherein the at least one of the series of tiered well construction activities comprises a drilling operation.

14. The system of claim 12, wherein the at least one constraint includes at least one of: a time-based constraint, a depth-based constraint, an equipment operation-based constraint, and a formation-based constraint.

15. The system of claim 12, wherein the at least one constraint pertains to at least one goal, wherein the at least one goal is based on at least one of: policies, standards, procedures or guidelines.

16. The system of claim 12, wherein the instructions instruct the system to dynamically change the series of tiered well construction activities to adhere to the at least one constraint, wherein a revised digital plan that pertains to the dynamically changed series of tiered well construction activities is dynamically generated.

17. The system of claim 12, wherein the instructions instruct the system to fuse the at least one constraint with additional constraints to control the field equipment to perform at least one of the series of tiered well construction activities based on the fused constraints.

18. The system of claim 12, wherein the at least one constraint includes an activity that is dynamically altered based on circumstances and is interspersed between other activities associated with a drilling operation.

19. A non-transitory computer-readable storage medium storing instructions that when executed by a computer, which includes a processor performs a method, the method comprising:
receiving information and analyzing the information with respect to tiered well construction activities;
determining at least one constraint associated with the tiered well construction activities based on the information;
generating a workflow, based on the at least one constraint, to be performed by field equipment, wherein the workflow includes at least a series of tiered well construction activities;
generating a digital well plan for the workflow;
executing the digital well plan to control the field equipment; and
monitoring performance of at least one of the series of tiered well construction activities using one or more sensors to ensure that the at least one constraint is adhered to by control of the field equipment, wherein the at least one constraint includes a dynamic constraint that arises in response to the monitoring of the performance of the at least one of the series of tiered well construction activities, wherein the dynamic constraint is based on at least one change in circumstances.

20. The non-transitory computer-readable storage medium of claim 19, wherein the at least one constraint includes at least one of: a time-based constraint, a depth-based constraint, an equipment operation-based constraint, and a formation-based constraint.

* * * * *